(12) United States Patent
Kamihisa

(10) Patent No.: US 12,003,677 B2
(45) Date of Patent: Jun. 4, 2024

(54) IMAGE FORMING APPARATUS AND DOCUMENT DATA CLASSIFICATION METHOD

(71) Applicant: SHARP KABUSHIKI KAISHA, Sakai (JP)

(72) Inventor: Sho Kamihisa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 212 days.

(21) Appl. No.: 17/318,889

(22) Filed: May 12, 2021

(65) Prior Publication Data
US 2021/0360112 A1    Nov. 18, 2021

(30) Foreign Application Priority Data
May 15, 2020  (JP) ................................ 2020-085933

(51) Int. Cl.
    *G06F 16/35*    (2019.01)
    *H04N 1/00*     (2006.01)
(52) U.S. Cl.
    CPC ......... *H04N 1/00339* (2013.01); *G06F 16/35* (2019.01); *H04N 1/00331* (2013.01); *H04N 1/00408* (2013.01); *H04N 1/00514* (2013.01); *H04N 2201/0094* (2013.01)
(58) Field of Classification Search
    None
    See application file for complete search history.

(56) References Cited

U.S. PATENT DOCUMENTS

| | | | | |
|---|---|---|---|---|
| 7,958,147 B1 * | 6/2011 | Turner | .................. | G06F 21/604 |
| | | | | 707/694 |
| 8,996,350 B1 * | 3/2015 | Dub | .................. | G06F 16/24578 |
| | | | | 707/673 |

(Continued)

FOREIGN PATENT DOCUMENTS

| | | | | |
|---|---|---|---|---|
| JP | 2013251610 A | 12/2013 | | |
| JP | 2017-117335 | * 6/2017 | ............. | G06V 10/10 |

(Continued)

*Primary Examiner* — Tarek Chbouki
*Assistant Examiner* — Loan T Nguyen
(74) *Attorney, Agent, or Firm* — ScienBiziP, P.C.

(57) ABSTRACT

An image forming apparatus includes an operation device; a storage that stores classification determination information and a user classification rule; a memory that stores instructions; and a processor. The processor executes the instructions stored to: input image data on a document; acquire the input image data on the document; acquire, from the acquired image data, feature quantity; and update the user classification rule. The user classification rule is information in which a criterion for classifying a document having specific feature quantity is set for each user in association with the specific feature quantity. When the user uses the operation device to perform a specific classification operation on image data on a document having the acquired feature quantity, the processor executes the instructions to change a criterion of the user classification rule of the user associated with the acquired feature quantity to a criterion corresponding to the specific classification operation.

8 Claims, 14 Drawing Sheets

(56) References Cited

U.S. PATENT DOCUMENTS

| | | | | |
|---|---|---|---|---|
| 2005/0203943 A1* | 9/2005 | Su | ................. | G06F 16/954 |
| | | | | 707/999.102 |
| 2015/0148006 A1* | 5/2015 | Skudlark | ................. | H04W 4/12 |
| | | | | 455/26.1 |
| 2016/0380936 A1* | 12/2016 | Gunasekara | ......... | G06Q 10/107 |
| | | | | 709/206 |
| 2019/0311285 A1* | 10/2019 | Miserendino | ............ | G06N 5/04 |

FOREIGN PATENT DOCUMENTS

| | | | |
|---|---|---|---|
| JP | 2017-117335 A | 6/2017 | |
| WO | WO-2016055159 A2 * | 4/2016 | ............ B60W 30/06 |

\* cited by examiner

FIG. 2

INPUT DOCUMENT DATA

| | FILE NAME | USER NAME | FEATURE QUANTITY | STORAGE FOLDER |
|---|---|---|---|---|
| 1 | F001 | USER U1 | A | MTG MATERIAL |
| 2 | F002 | USER U1 | C | MINUTES |
| 3 | F003 | USER U2 | A | MTG MATERIAL |
| 4 | F004 | USER U3 | B | ORDER FORM |
| 5 | F050 | USER U5 | A | MTG MATERIAL |
| 6 | F100 | USER U3 | X | UNCLASSIFIED |

FIG. 3

ACQUIRED FEATURE QUANTITY INFORMATION OF FILE NAME F001

ACQUIRED FEATURE QUANTITY INFORMATION

| FILE EXTENSION | .pptx |
|---|---|
| "AGENDA" | FIRST PAGE, SECOND LINE |
| "MEETING" | FIRST PAGE, THIRD LINE |
| "COUNTERMEASURE" | THIRD PAGE, EIGHTH LINE |

FIG. 4

CLASSIFICATION FOLDER INFORMATION

| FOLDER NAME | MTG MATERIAL |
|---|---|
| FEATURE QUANTITY | A |

| F001 | USER U1 |
|---|---|
| F003 | USER U2 |

| FOLDER NAME | MINUTES |
|---|---|
| FEATURE QUANTITY | C |

| F002 | USER U1 |
|---|---|
| F050 | USER U5 |

| FOLDER NAME | ORDER FORM |
|---|---|
| FEATURE QUANTITY | B |

| F004 | USER U3 |
|---|---|

| FOLDER NAME | UNCLASSIFIED |
|---|---|

| F100 | USER U3 |
|---|---|
|  | FEATURE QUANTITY :X |

FIG. 5

FEATURE QUANTITY CRITERION INFORMATION

FEATURE QUANTITY OF MTG MATERIAL (FEATURE QUANTITY :A)

| | |
|---|---|
| 1 | FILE EXTENSION IS EITHER ".PPTX" OR ".JPG". |
| 2 | "AGENDA" IS INCLUDED BEFORE TENTH LINE FROM TOP ON FIRST PAGE. |
| 3 | EITHER "MTG" OR "MEETING" IS INCLUDED BEFORE TENTH LINE FROM TOP ON FIRST PAGE. |
| 4 | "TASK" IS INCLUDED BEFORE TENTH LINE FROM TOP ON FIRST PAGE. |
| 5 | FILE CONTAINS EITHER "EXAMINATION RESULT" OR "INFORMATION SHARING". |
| 6 | FILE CONTAINS ANY OF "COUNTERPLAN", "MEASURE", "PROPOSED ACTION", AND "REMEDY". |

FEATURE QUANTITY OF MINUTES (FEATURE QUANTITY :C)

| | |
|---|---|
| 1 | FILE NAME INCLUDES "MINUTES". |
| 2 | EITHER "MTG" OR "MEETING" IS INCLUDED BEFORE TENTH LINE FROM TOP ON FIRST PAGE. |
| 3 | "MINUTES" IS INCLUDED BEFORE TENTH LINE FROM TOP ON FIRST PAGE. |
| 4 | "PARTICIPANT" IS INCLUDED BEFORE TENTH LINE FROM TOP ON FIRST PAGE. |
| 5 | "LOCATION" OR "DATE AND TIME" IS INCLUDED BEFORE TENTH LINE FROM TOP ON FIRST PAGE. |

FIG. 6

PURCHASE ORDER

_____ CO., LTD.   ORDER NO.

DEAR SIR OR MADAM :                ORDER DATE

SUBJECT : _____   XX CO, LTD.
     ORDER AS FOLLOWS              ZIP CODE
                                   YY-WARD, TOKYO

DELIVERY
DEADLINE : ARRANGED SEPARATELY              TEL :
PAYMENT CONDITION : SETTLED AT END OF MONTH AND PAID AT END OF FOLLOWING MONTH   FAX :
ESTIMATE NO : _____        E-Mail :
                                            ATTENTION :

TOTAL AMOUNT   JPY 0  (TAX INCLUDED)

| No. | ABSTRACT | QUANTITY | UNIT PRICE | AMOUNT |
|-----|----------|----------|------------|--------|
|     |          |          |            |        |
|     |          |          |            |        |
|     |          |          |            |        |
|     |          |          |            |        |
|     |          |          |            |        |
|     |          |          |            |        |
|     |          |          |            |        |
|     |          |          |            |        |
|     |          |          |            |        |
|     |          |          |            |        |
|     |          |          |            |        |

|                        |     |
|------------------------|-----|
| SUBTOTAL               | ¥0  |
| SALES TAX              | ¥0  |
| WITHHOLDING INCOME TAX | ¥0  |
| TOTAL                  | ¥0  |

| NOTE |  |
|------|--|

FIG. 7

| USER RULE UPDATE CONDITION INFORMATION | | | | |
|---|---|---|---|---|
| USER U1 | USER U2 | USER U3 | USER U4 | USER U5 |
| VALID | VALID | VALID | INVALID | VALID |

| | |
|---|---|
| VALID : | CHANGE USER CLASSIFICATION RULE, TOO, WHEN OVERALL CLASSIFICATION RULE IS CHANGED |
| INVALID : | MAINTAIN (DO NOT CHANGE) USER CLASSIFICATION RULE EVEN THOUGH OVERALL CLASSIFICATION RULE IS CHANGED |

FIG. 8

OVERALL RULE UPDATE CONDITION INFORMATION

| | UPDATE CONDITION ITEM | UPDATE CONDITION (SETTING VALUE) |
|---|---|---|
| 1 | NUMBER OF PEOPLE FOR IDENTICAL OPERATION: N | $N \geq 3$ (PEOPLE) |
| 2 | RATE FOR IDENTICAL OPERATION: R (%) | $R \geq 70$ (%) |
| 3 | DESIGNATED USER | USER U5 |

FIG. 9

USER NOTIFICATION SETTING INFORMATION
(NOTIFICATION OF STORAGE FOLDER)

| DEFAULT NOTIFICATION SETTING METHOD | DISPLAY | (OR TRANSMISSION OR CONFIRMATION REQUEST) |
|---|---|---|

| USER NAME | DISPLAY | TRANSMISSION | UPON CONFIRMATION REQUEST RECEPTION |
|---|---|---|---|
| USER U1 | YES | NO | TRANSMIT |
| USER U2 | NO | YES | TRANSMIT |
| USER U3 | YES | YES | NOT TRANSMIT |
| USER U4 | NO | NO | TRANSMIT |
| USER U5 | YES | YES | TRANSMIT |

FIG. 10

CLASSIFICATION DETERMINATION INFORMATION BH00

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | |
| B | ORDER FORM | | | MTG MATERIAL | | |
| C | MINUTES | | MTG MATERIAL | | | MTG MATERIAL |

FIG. 11

CASE WHERE USER U1 STORES FILE HAVING FEATURE QUANTITY C IN MTG MATERIAL

CLASSIFICATION DETERMINATION INFORMATION BH01

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | |
| B | ORDER FORM | | | MTG MATERIAL | | |
| C | MINUTES | MTG MATERIAL | MTG MATERIAL | | | MTG MATERIAL |

FIG. 12

CASE WHERE OVERALL CLASSIFICATION RULE OF FEATURE QUANTITY C IS CHANGED AS NUMBER OF PEOPLE WHO HAVE STORED FILE HAVING FEATURE QUANTITY C IN MTG MATERIAL IS THREE OR MORE

CLASSIFICATION DETERMINATION INFORMATION BH02

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | |
| B | ORDER FORM | | | MTG MATERIAL | | |
| C | MTG MATERIAL | MTG MATERIAL | MTG MATERIAL | | | MTG MATERIAL |

FIG. 13

CASE WHERE USER RULE UPDATE CONDITION INFORMATION OF USER U4 IS SET TO INVALID

CLASSIFICATION DETERMINATION INFORMATION BH03

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | |
| B | ORDER FORM | | | MTG MATERIAL | | |
| C | MTG MATERIAL | MTG MATERIAL | MTG MATERIAL | | MINUTES | MTG MATERIAL |

FIG. 14

CASE WHERE DESIGNATED USER U5 HAS PERFORMED OPERATION TO STORE FILE F050 HAVING FEATURE QUANTITY A IN MINUTES

CLASSIFICATION DETERMINATION INFORMATION BH04

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | MINUTES |
| B | ORDER FORM | | | MTG MATERIAL | | |
| C | MINUTES | | MTG MATERIAL | | | MTG MATERIAL |

FIG. 15

AFTER OVERALL CLASSIFICATION RULE IS CHANGED
(CASE WHERE USER RULE UPDATE CONDITION INFORMATION OF USER U4: INVALID)

CLASSIFICATION DETERMINATION INFORMATION BH05

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MINUTES | | | | MTG MATERIAL | MINUTES |
| B | ORDER FORM | | | MTG MATERIAL | | |
| C | MINUTES | | MTG MATERIAL | | | MTG MATERIAL |

FIG. 16

CASE WHERE USER U3 HAS PERFORMED OPERATION TO STORE FILE F100 HAVING FEATURE QUANTITY X, STORED IN UNCLASSIFIED FOLDER, IN MINUTES FOLDER

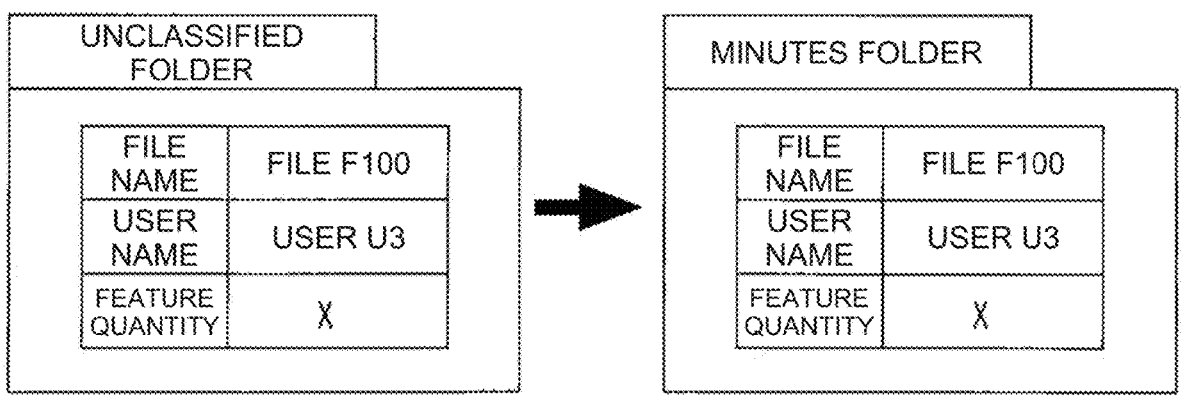

FIG. 17

CASE WHERE USER U3 HAS PERFORMED OPERATION TO STORE FILE F100 HAVING FEATURE QUANTITY X, STORED IN UNCLASSIFIED FOLDER, IN MINUTES FOLDER

CLASSIFICATION DETERMINATION INFORMATION BH06

| LEARNING DATA | | USER CLASSIFICATION RULE | | | | |
|---|---|---|---|---|---|---|
| FEATURE QUANTITY | OVERALL CLASSIFICATION RULE | USER U1 | USER U2 | USER U3 | USER U4 | USER U5 |
| A | MTG MATERIAL | | | | | |
| B | ORDER FORM | | | MTG MATERIAL | | |
| C | MINUTES | | MTG MATERIAL | | | MTG MATERIAL |
| X | MINUTES | | | MINUTES | | |

IMAGE FORMING APPARATUS AND DOCUMENT DATA CLASSIFICATION METHOD

CROSS-REFERENCE TO RELATED APPLICATION

The present application claims priority from Japanese Application Number JP2020-85933, the content to which is hereby incorporated by reference into this application.

BACKGROUND OF THE INVENTION

Field of the Invention

One aspect of the present invention relates to an image forming apparatus and, more particularly, to an image forming apparatus having a function to classify an input document in accordance with a predetermined criterion.

Description of the Related Art

There is a conventionally used image forming apparatus having a document recognition function to read a document placed on a platen, recognize the image data on the read document, extract a character, photograph, or the like, included in the image data, and acquire the feature quantity of the document.

The acquired feature quantity is used to estimate the type of read document and automatically store the image data in a predetermined folder that is classified for each type.

For example, Japanese Unexamined Patent Application Publication No. discloses an image processing apparatus that acquires the feature quantity of the input image obtained by scanning a document and performs classification processing on the input image by using the feature quantity and a previously trained and generated classification rule so as to determine the classification destination (storage destination).

There is a disclosure that, when the input image is an unknown image that is not able to be classified as a learnt image, the input image is stored in an unknown folder, the log of operations performed on the input image stored in the unknown folder is acquired, and the classification rule is retrained (regenerated) by using the feature quantity of the input image and the operation log.

SUMMARY OF THE INVENTION

Unfortunately, with the conventional image forming apparatus, when multiple users use the function to classify the image data on the read document and store the image data in a predetermined folder, the image data is not always stored in the folder desired by the user.

When the operation log storing the operations performed by users is acquired to retrain the classification rule, the operation of a first user who performed an operation on an input image G1 stored in the unknown folder is applied to retrain the classification rule.

For example, when the storage destination of the input image G1 is changed from the unknown folder to a specific folder due to the moving operation on the input image G1 performed by the first user, an input image G2 having the feature quantity similar to that of the input image G1 is subsequently stored in the changed specific folder. That is, when not only the first user but also another user causes the document having the input image G2 to be read, the input image G2 is stored in the identical specific folder.

If the changed specific folder is the storage destination desired by multiple users, the specific folder may be easily reused, and the input image G2 may be easily found by other users.

If the moving operation performed by the first user is unusual and the changed specific folder is not the storage destination desired by multiple users, however, the input image of the document read by other users is stored in an unintended specific folder and therefore may be difficult to be found by other users.

Furthermore, in order to easily find the input image stored by another user, the operation needs to be performed to change the storage destination of the input image from the specific folder to the folder intended by another user each time, which results in a large operation burden on the user.

In terms of reuse of a stored input image, it is generally considered desirable that the documents having the identical feature quantity be stored in the storage destination folder desired by multiple users.

In some cases, however, some users desire to store the read input image in the storage destination folder desired only by the users; therefore, it is desirable to set the storage destination folder individually, and it may be undesirable to change the storage destination folder due to the operation input by the first user.

One aspect of the present invention has been made in consideration of the above circumstances and has an object such that the classification folder that is likely to be set as the storage destination by multiple users may be set as the storage folder for the input document data, the possibility of storage of the input document data in the classification folder not intended by the user may be reduced, the stored document data may be easily reused, and the operational burden on the user when the input document data is classified and stored may be reduced.

An aspect of the present invention provides an image forming apparatus including: an operation device; a storage that stores classification determination information that includes a determination criterion rule including an overall classification rule and a user classification rule for classifying image data on a document input to the image forming apparatus; a memory that stores instructions; and a processor that executes the instructions stored in the memory to: input image data on a document; acquire the input image data on the document; acquire, from the acquired image data, feature quantity that is information with which the document is distinguishable; and update the user classification rule, wherein the user classification rule is information in which a criterion for classifying a document having specific feature quantity is set for each user in association with the specific feature quantity, and when the user uses the operation device to perform a specific classification operation on image data on a document having the acquired feature, the processor executes the instructions to change a criterion of the user classification rule of the user associated with the acquired feature quantity to a criterion corresponding to the specific classification operation.

The processor executes the instructions to, when the specific classification operation performed by the user is an operation to move the image data on the document having the acquired feature quantity to a predetermined storage folder, change the criterion of the user classification rule of the user associated with the acquired feature quantity to a criterion indicating that image data on a document input by the user in future and having the feature quantity is to be stored in the predetermined storage folder.

The feature quantity is information which includes a character and a figure acquired by character recognition and image recognition of image data on an input document and with which a type of the input document is distinguishable.

A name of a folder which the document having the specific feature quantity is classified into and stored in is set as the criterion for classifying the document having the specific feature quantity.

The overall classification rule is a determination criterion applied to all users and is information in which a criterion for classifying a document having specific feature quantity is set in association with the specific feature quantity, in a case where the overall classification rule and the user classification rule of a user are set in association with the specific feature quantity, when image data on a document input by the user and having the specific feature quantity is classified, the user classification rule of the user is preferentially applied so that the image data input by the user is classified and stored, and in a case where only the overall classification rule is set in association with the specific feature quantity and the user classification rule of each user is not set, when image data on a document input by the user and having the specific feature quantity is classified, the overall classification rule is applied so that the image data input by the user is classified and stored.

The processor executes the instructions to update the overall classification rule in the classification determination information based on overall rule update condition information preset in the storage is further provided, wherein in a case where the overall classification rule and the user classification rules of users are set in association with the specific feature quantity, when a criterion corresponding to an identical classification operation is set in any of the user classification rules of the users and the overall rule update condition information is satisfied, the processor executes the instructions to change a criterion of the overall classification rule associated with the specific feature quantity to a criterion corresponding to the identical classification operation.

A minimum number or a minimum rate of users for whom a criterion corresponding to an identical classification operation is set in the user classification rules of the users is preset in the overall rule update condition information, and when the criterion corresponding to the identical classification operation is set in the user classification rules of equal to or more than the minimum number of users or equal to or more than the minimum rate of users, the criterion of the overall classification rule associated with the specific feature quantity is changed to the criterion corresponding to the identical classification operation.

When the overall classification rule and the user classification rule of a designated user who is able to change the criterion of the overall classification rule are set in association with the specific feature quantity and the criterion of the overall classification rule is different from the criterion of the user classification rule of the designated user, the criterion of the overall classification rule associated with the specific feature quantity is changed to a criterion identical to the criterion of the user classification rule of the designated user.

The user rule update condition information having a setting as to whether the user classification rule is to be updated is previously stored for each user in the storage, and when information indicating that the user classification rule is not to be updated is set in the user rule update condition information of the user and when an event causing a change in the criterion of the overall classification rule associated with the specific feature quantity occurs, the criterion of the user classification rule of the user associated with the specific feature quantity is not changed and the criterion of the overall classification rule associated with the specific feature quantity before the change is set as the criterion of the user classification rule of the user, or when the criterion of the user classification rule of the user is already set, the already set criterion of the user classification rule of the user is maintained.

The processor executes the instructions to, when the criterion of the user classification rule is changed, notify the user of the changed criterion, wherein a method of notification to the user includes any one or more of display of the changed criterion, transmission of the changed criterion to an information processing apparatus owned by the user, and transmission of the changed criterion to an information processing apparatus owned by the user in response to a confirmation request transmitted from the information processing apparatus.

Another aspect of the present invention provides a document data classification method for an image forming apparatus, the document data classification method including storing classification determination information that includes a determination criterion rule including an overall classification rule and a user classification rule for classifying image data on a document input to an image forming apparatus, the user classification rule being information in which a criterion for classifying a document having specific feature quantity is set for each user in association with the specific feature quantity; inputting image data on a document by an input operation of the user; first acquiring the image data on the document input at the inputting; second acquiring, from the image data on the document acquired at the first acquiring, feature quantity that is information with which the document is distinguishable; classifying and storing the image data on the document acquired at the first acquiring based on the overall classification rule associated with the feature quantity or the user classification rule of the user associated with the feature quantity included in the classification determination information; and changing, when the user performs a specific classification operation on image data on a document having the feature quantity acquired at the second acquiring, a criterion of the user classification rule of the user associated with the feature quantity acquired at the second acquiring to a criterion corresponding to the specific classification operation.

According to one aspect of the present invention, after the image data on an input document is acquired, the feature quantity of the acquired image data is acquired and, when the user performs a specific classification operation on the image data on the document having the acquired feature quantity, the criterion of the user classification rule of the user associated with the acquired feature quantity is changed to the criterion corresponding to the specific classification operation, whereby the classification folder that is likely to be set as the storage destination by multiple users may be set as the storage destination folder for the input document data, the possibility of storage of the input document data in the classification folder not intended by the user may be reduced, the stored document data may be easily reused, and the operational burden on the user when the input document data is classified and stored may be reduced.

BRIEF DESCRIPTION OF THE DRAWINGS

FIG. 2 is an explanatory diagram of an embodiment of information stored in a storage according to an aspect of the present invention;

FIG. 3 is an explanatory diagram of an embodiment of information stored in the storage according to an aspect of the present invention;

FIG. 4 is an explanatory diagram of an embodiment of information stored in the storage according to an aspect of the present invention;

FIG. 5 is an explanatory diagram of an embodiment of feature quantity criterion information stored in the storage according to an aspect of the present invention;

FIG. 6 is an explanatory diagram of an embodiment of feature quantity criterion information stored in the storage according to an aspect of the present invention;

FIG. 7 is an explanatory diagram of an embodiment of information stored in the storage according to an aspect of the present invention;

FIG. 8 is an explanatory diagram of an embodiment of information stored in the storage according to an aspect of the present invention;

FIG. 9 is an explanatory diagram of an embodiment of information stored in the storage according to an aspect of the present invention;

FIG. 10 is an explanatory diagram of an embodiment of classification determination information stored in the storage according to an aspect of the present invention;

FIG. 11 is an explanatory diagram of an embodiment of the classification determination information stored in the storage according to an aspect of the present invention;

FIG. 12 is an explanatory diagram of an embodiment of the classification determination information stored in the storage according to an aspect of the present invention;

FIG. 13 is an explanatory diagram of an embodiment of the classification determination information stored in the storage according to an aspect of the present invention;

FIG. 14 is an explanatory diagram of an embodiment of the classification determination information stored in the storage according to an aspect of the present invention;

FIG. 15 is an explanatory diagram of an embodiment of the classification determination information stored in the storage according to an aspect of the present invention;

FIG. 16 is an explanatory diagram of an embodiment when an operation is performed to change a storage folder according to an aspect of the present invention;

FIG. 17 is an explanatory diagram of an embodiment of the classification determination information stored in the storage according to an aspect of the present invention;

DESCRIPTION OF THE PREFERRED EMBODIMENTS

Embodiments of the present invention are described below with reference to the drawings. The present invention is not limited to the description of the embodiments below.

Although the present invention is an image forming apparatus described below, the present invention is applicable to other information processing apparatuses, image processing apparatuses, and the like, having the function of inputting a document in which information such as images, figures, and characters is described.

Configuration of Image Forming Apparatus

Figure 1:
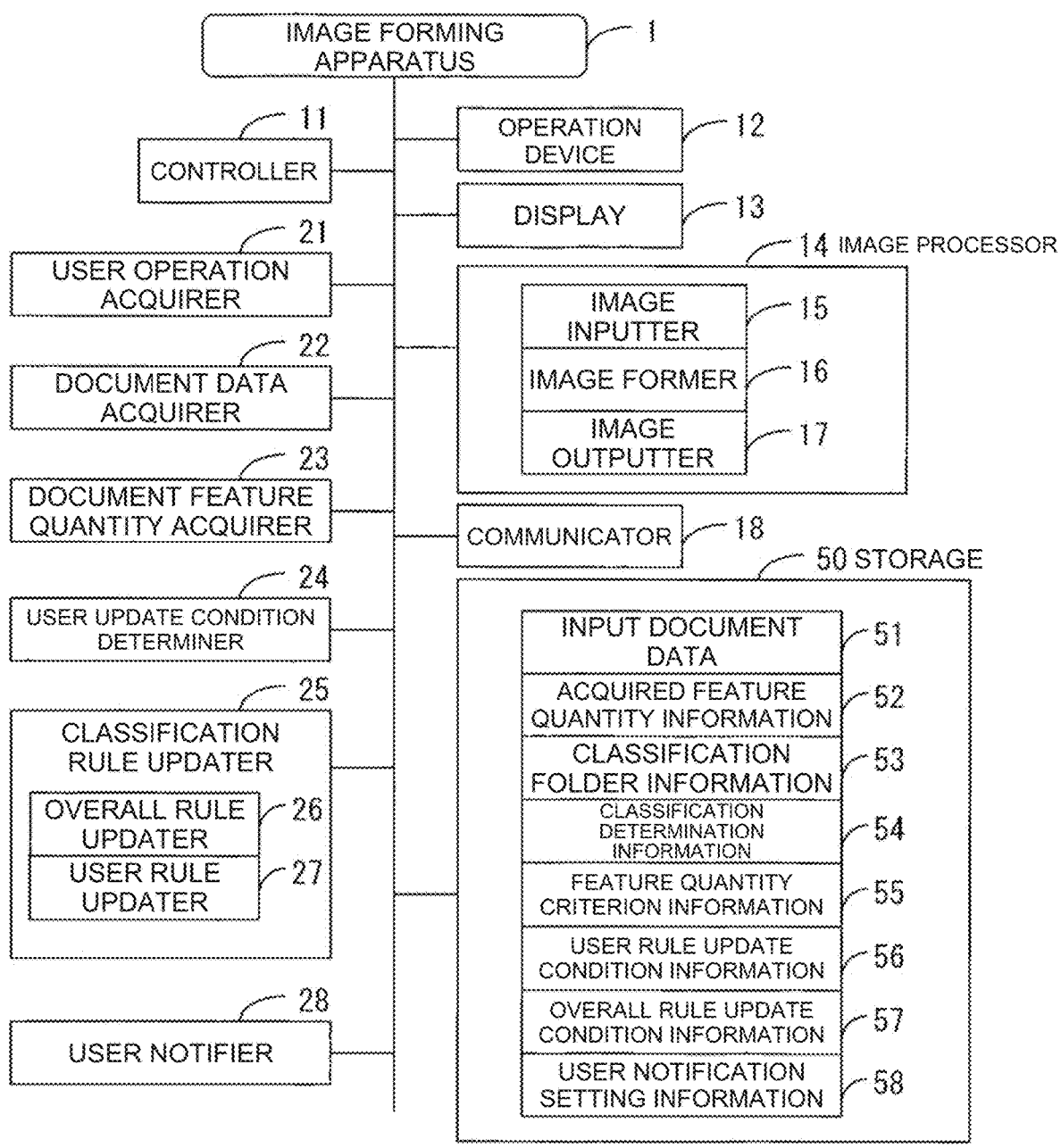
FIG. 1 is a functional block diagram of an embodiment of an image forming apparatus according to an aspect of the present invention.

FIG. 1 is a functional block diagram of an embodiment of an image forming apparatus according to the present invention.

An image forming apparatus (hereinafter also referred to as multifunction peripheral (MFP)) 1 is an apparatus that processes image data, for example, an electronic device having a duplication (copy) function, a print function, a document read (scan) function, a document edit function, a document storage function, a document transmission (fax) function, a communication function, etc.

Although the image forming apparatus 1 according to one aspect of the present invention has, in particular, a print function, a document read (scan) function, and a document classification/storage function in the description according to the embodiments below, the image forming apparatus 1 may have other functions.

In FIG. 1, the image forming apparatus (MFP) 1 according to one aspect of the present invention primarily includes a controller 11, an operation device 12, a display 13, an image processor 14, a communicator 18, a user operation acquirer 21, a document data acquirer 22, a document feature quantity acquirer 23, a user update condition determiner 24, a classification rule updater 25, a user notifier 28, and a storage 50.

The image processor 14 primarily includes an image inputter 15, an image former 16, and an image outputter 17.

The classification rule updater 25 includes an overall rule updater 26 and a user rule updater 27.

The controller 11 is a part that controls the operation of each of components such as the operation device 12 and the image processor 14 and is implemented by a microcomputer primarily including a CPU, a ROM, a RAM, an I/O controller, a timer, etc.

The CPU organically operates various types of hardware based on a control program previously stored in the ROM, or the like, to execute an image forming function, a document feature quantity acquisition function, and the like, according to one aspect of the present invention.

Out of the above-described components, the document feature quantity acquirer 23, the user update condition determiner 24, the classification rule updater 25, the overall rule updater 26, and the user rule updater 27 are functional blocks whose operations are performed by the CPU based on a predetermined program.

The operation device 12 is an input device for a user of the image forming apparatus to perform a predetermined input operation. For example, the operation device 12 is a part to input information such as characters and to select and input a function and uses a keyboard, a mouse, a touch panel, or the like.

The keys operated by the user include an operation start key, a function selection key, a setting key, etc.

For example, the user's input operation on the touch panel or the start key for a read operation causes the execution of document reading.

An input operation on the touch panel or a predetermined selection key causes selection and input of the storage destination (storage folder) of the image data on a read document, change in the storage destination (storage folder) of the image data, change in the folder name of the storage folder, or deletion of the image data.

The display 13 is a part that presents information and makes a presentation to notify the user of the information needed to execute each function, the result of execution of a function, etc. For example, an LCD, an organic EL display, or the like, is used as the display 13, and when a touch panel is used as the operation device 12, the display 13 and the touch panel are disposed so as to be overlapped with each other.

The display 13 uses characters, symbols, figures, images, icons, animations, videos, and the like, to present, for example, the setting of setting items used for printing, or the like, of the image forming apparatus, the information needed to execute a document read function, the operation screen of a selected function, etc.

The image processor 14 is a part that executes an image forming function, which is a primary function of the image forming apparatus, and primarily includes the image inputter 15, the image former 16, and the image outputter 17.

Primarily, the image inputter 15 is a part that inputs predetermined image data, the image former 16 is a part that converts input image data into information that may be printed, or the like, and the image outputter 17 is a part that outputs formed print information, or the like, to a print sheet, etc.

The image inputter 15 is a part that inputs the image data on a document having an image, character, figure, or the like, described thereon and is, for example, a part that reads a document placed on a platen, etc.

A scanner (reading device) that reads a document having information described thereon is used as the image inputter 15.

In order to read a document, the image forming apparatus 1 includes a document placement table (platen) on which the document is placed and a document cover that presses the document.

The image forming apparatus 1 may include an automatic document feeder (ADF) on which multiple documents are placed and are automatically conveyed one by one so as to be read.

There are various methods for inputting image information, and for example, a document having an image, or the like, described thereon is read by a scanner, and the image data (hereinafter referred to as input document data) on the document is stored in the storage 50.

For example, an interface that connects an external storage medium, such as a USB memory, corresponds to the image inputter 15.

It is possible that an electronic data file of image information to be input is stored in an external storage medium such as a USB memory, the USB memory, or the like, is connected to an input interface such as a USB terminal, and a predetermined input operation is performed by the operation device 12 so that a desired electronic data file stored in the USB memory, or the like, is read and stored as input document data in the storage 50.

When input document data is printed on a recording medium, for example, the image former 16 usually performs each process for charging, exposure, development, transfer, cleaning, neutralization, and fixing in a successive manner so as to form the input document data as an image on a recording medium.

During a developing process, toner is supplied from a toner cartridge to a developing device, an electrostatic latent image formed on the surface of a charged photosensitive drum is developed, and the toner image corresponding to the electrostatic latent image is formed. The toner image formed on the surface of the photosensitive drum is transferred onto a recording medium by a transfer device and then fixed to the recording medium due to heating by the fixing device.

The image former 16 converts the input document data into information in a transferable or displayable form.

The image outputter 17 is a part that outputs the input document data and corresponds to for example a printer to print the input document data on the read document on a predetermined print sheet (sheet medium).

The output of the input document data includes not only printing but also storage of the input document data on a scanned document, fax transmission of the input document data on a scanned document, and the like.

The image output corresponds to, for example, storage of the input document data on a scanned document in an external storage medium such as a USB memory, transmission of the input document data to a different information processing apparatus or server via a network such as the Internet, or classification and storage in a specific storage folder.

The communicator 18 is a part that performs data communications with a different communication device via a network.

For example, an electronic data file transferred from an information processing apparatus such as a personal computer, a mobile terminal, or a server is received.

The input document data generated by the image forming apparatus 1 according to one aspect of the present invention is transferred to an external storage device (a USB memory, etc.) coupled to the image forming apparatus 1 or is transmitted via a network to an information processing apparatus such as a personal computer or a server owned by the user who has input the document.

Any existing communication networks, e.g., a wide area communication network such as the Internet or a LAN, may be used as the network, and either wired communication or wireless communication may be used as a communication form.

As described below, in order to notify the user of the storage location (storage folder) of the input document data and have the user confirm it, the communicator 18 may transmit the folder name, or the like, of the storage folder in which the input document data is stored to an information processing apparatus such as a personal computer owned by the user.

The user operation acquirer 21 is a part that acquires the content of the input operation performed by the user using the operation device 12.

There are many input operations performed by the user and, according to one aspect of the present invention, in particular, an operation performed on input document data is acquired.

The operations performed on the input document data include the operation to classify the input document data, for example, the operation to store the input document data in a specific storage folder, the operation to move the input document data (change the storage folder), the operation to delete the input document data, the operation to change the name (folder name) of the storage folder, etc.

The pattern (document operation pattern) of a classification operation on the input document data as described above is previously stored, and the log of input operations performed using the operation device 12 is stored on a constant basis.

When the log of input operations includes the input operation that matches the series of input operations corresponding to a previously stored document operation pattern, it is determined that a classification operation has been performed on the input document data, and the input operation of the document operation pattern is acquired.

For example, when the log of input operations includes the document operation pattern for moving the input document data, it is determined that the operation of moving the input document data has been performed, and the input operation is acquired. Based on the content of the acquired input operation, the process is performed to update classification determination information as described below.

The document data acquirer 22 is a part that acquires the image data on a document input by the image inputter 15 and stores the file name for identifying the image data and the input user name in association with each other as input document data 51 in the storage 50 as described below.

The user name is the name of the user who uses the image forming apparatus, for example, the user identification information that is set and input by the user or the information corresponding to the user name or the user ID used for user authentication when user authentication is needed to use the image forming apparatus.

For example, when the input user name is U1 and the file name of the image data on the read document by the user U1 is F001, U1 and F001 are associated with each other and stored as the single input document data 51.

As described below, the input document data 51 includes feature quantity in addition to the user name and the file name. The input document data may be stored so as to include the name (folder name) of the storage folder.

The document feature quantity acquirer 23 is a part that acquires, from the acquired image data (input document data), the feature quantity of the input document data.

The feature quantity is information with which the input document is distinguishable and is information obtained as a result of recognition of the image data on the document.

Image data analysis, character recognition, and image recognition are executed so that information such as a character, symbol, figure, line segment, or photograph may be extracted.

The information combining the extracted information and the position, shape, color, arrangement pattern, etc., of the extracted information in the document is acquired as feature quantity of the input document data.

That is, the feature quantity of the input document data is information that includes a character, a figure, or the like, acquired after character recognition and image recognition on the image data of the input document and that makes it possible to determine the type of input document.

For example, when the document is "minutes", there is a high possibility that, at the upper portion of a first page of the document, the character information "minutes" is described and the character string pattern specifying "date and time" and "location" is described. Further, it is often the case that the file name includes the character string "minutes".

In a case where the image data on the input document includes the character strings "minutes", "date and time", and "location" and the file name includes the character string "minutes" after the analysis of the image data, "minutes" and its description position (for example, the page and the line on which "minutes" is present), "date and time" and "location" and their description positions (the pages and the lines on which "date and time" and "location" are present), and the file name including "minutes" are acquired as the feature quantity of the input document data.

The acquired feature quantity is stored as acquired feature quantity information 52 in the storage 50.

Character strings such as "minutes", "date and time", and "location" are preferably previously registered in the storage as keywords in order to acquire the feature quantity.

A conventional technique may be used as the technique for character recognition and image recognition.

The user update condition determiner 24 is a part that determines whether to update the user classification rule that is set for each user.

The user classification rule is one of the classification rules set in classification determination information 54 illustrated in FIG. 10, and the like, described below, and is information in which the criterion for classifying a document having specific feature quantity is set for each user in association with the specific feature quantity.

A classification criterion (rule) for each user who stores the input document data is set as the criterion for classifying the document having specific feature quantity and, for example, the name of a folder which the document having the specific feature quantity is classified into and stored in is set.

For example, when the user U1 performs the operation to store the file of the input document data having certain feature quantity A in a certain folder FB, the user classification rule of the user U1 stores the folder FB in which the document data input by the user U1 is stored.

Afterward, when the user U1 causes a document having the identical feature quantity A to be read, the file of the input document data on the document is automatically stored in the folder FB based on the user classification rule of the user U1 corresponding to the feature quantity A.

It is determined whether the user classification rule is to be updated based on user rule update condition information 56 illustrated in FIG. 7 described below.

The information (valid or invalid) as to whether the user classification rule is to be updated is preset for each user in the user rule update condition information 56.

For example, when "valid" is set in the user rule update condition information 56 for a certain user, it is determined that the user classification rule of the user is updated. In this case, when the overall classification rule in the classification determination information 54 is updated, the user classification rule of the user is also updated.

Conversely, when "invalid" is set in the user rule update condition information 56 for a certain user, it is determined that the user classification rule of the user is not updated. In this case, even when the overall classification rule in the classification determination information 54 is updated, the user classification rule of the user is not updated, and the previous user classification rule is maintained.

Valid/invalid update of the user classification rule is described in detail below.

The classification rule updater 25 is a part that changes the content of a determination criterion rule stored in the classification determination information 54.

As described below, the classification determination information 54 stores a determination criterion rule for classifying the image data on an input document, and the determination criterion rule includes the overall classification rule and the user classification rule.

When a predetermined condition is satisfied, the classification rule updater 25 changes both or either one of the overall classification rule and the user classification rule included in the determination criterion rules.

As illustrated in FIG. 1, the classification rule updater 25 includes the overall rule updater 26 and the user rule updater 27.

The overall rule updater 26 is a part that updates the overall classification rule in the classification determination information 54. The overall classification rule is updated based on overall rule update condition information 57 described below.

The overall rule update condition information 57 is information as illustrated in FIG. 8 described below.

When the update condition preset in the overall rule update condition information 57 is satisfied, the content of the overall classification rule is changed.

For example, in a case where the overall classification rule in the classification determination information 54 and the user classification rules of multiple users are set in association with first feature quantity P1, when the criterion corresponding to the identical classification operation is set for any of the user classification rules of the users and the overall rule update condition information 57 is satisfied, the overall rule updater 26 changes the criterion of the overall classification rule associated with the first feature quantity P1 to the criterion corresponding to the identical classification operation.

More specifically, it is assumed that, for example, more than a predetermined number (for example, three or more) of users among the users perform the identical input operation (moving operation) on the respective user's files of the input document data having the identical feature quantity P1 and stores the respective user's files in an identical specific storage folder FS by using a criterion different from the overall classification rule.

In this case, as more than a predetermined number of users perform the identical moving operation to move the files having the identical feature quantity P1 to the identical storage folder FS based on a criterion different from that of the overall classification rule, it is determined that the overall rule update condition information is satisfied, and the criterion of the overall classification rule is changed to the criterion corresponding to the identical classification operation.

Here, the identical classification operation is the operation to move the file having the identical feature quantity P1 to the identical storage folder FS, and the criterion corresponding to the identical classification operation is, for example, the criterion to move the file having the feature quantity P1 to the storage folder FS.

An embodiment for changing the overall classification rule is described below.

The user rule updater 27 is a part that updates the user classification rule in the classification determination information 54.

The user classification rule is updated based on the user rule update condition information 56.

As illustrated in FIG. 7, the user rule update condition information 56 is information that is set for each user and, when the user rule update condition information for a certain user is "valid", the content of the user classification rule is changed.

When the user rule update condition information for a certain user is "invalid", the content of the user classification rule is not changed, and the content of the current user classification rule is maintained.

An embodiment for changing the user classification rule is described below.

The user notifier 28 is a part that, when the criterion of the user classification rule is changed, notifies the user of the changed criterion.

The user may be notified of the changed criterion even when the criterion of the overall classification rule is changed.

When the folder name of a classification folder (storage folder), in which the input document data on the input document is stored, is set as the criterion of the user classification rule, the user may be notified of at least the information including the changed folder name of the storage folder.

For example, when the classification folder storing input document data F011 on the document input by a user U3 is changed to a folder FC with the name "minutes", the display 13 of the image forming apparatus presents the information indicating that the classification folder storing the input document data F011 is the folder FC with the name "minutes" so as to notify the user U3 of the information.

The user U3 views the display content to confirm whether the input document data F011 has been stored in the classification folder intended by the user U3.

When the input document data F011 has been stored in the classification folder intended by the user U3, the user U3 may give input to approve the classification/storage process.

Conversely, when the input document data F011 has not been stored in the classification folder intended by the user U3, the user U3 may give input to disapprove the classification/storage process and perform the process to reclassify the input document data F011.

The user notification method is not only the display but also notifications using other ways.

The user notification method preferably includes, for example, any one or more of the display of the changed criterion, the transmission of the changed criterion to the information processing apparatus owned by the user, and the transmission of the changed criterion to the information processing apparatus owned by the user in response to the confirmation request transmitted from the information processing apparatus.

Information such as the folder name of the storage folder may be notified to the user by voice.

Information such as the folder name of the storage folder is transmitted as the changed criterion to the personal computer or mobile terminal owned by the user so that the user may confirm the storage folder of the read document at a position different from the image forming apparatus, such as the seat position of the user.

Furthermore, information such as the folder name of the folder storing the input document data is transmitted to the user's mobile terminal, or the like, when the confirmation request indicating that the storage folder of the input document data is to be confirmed is received from the user's mobile terminal, or the like, so that the user may confirm the storage folder of the read document when the user desires to confirm.

When there are multiple user notification methods, the notification method to be adopted may be previously set and stored.

The notification method may be changed for each user and, in this case, the notification method may be previously set and stored for each user and information such as the folder name of the storage folder may be notified to the user by using the notification method that has been set and stored.

The storage 50 is a part that stores information and programs needed to execute each function of the image processing apparatus according to one aspect of the present invention and uses a semiconductor storage device such as a ROM, a RAM, or a flash memory, a storage device such as an HDD or an SSD, and other storage media.

The storage 50 stores, for example, the input document data 51, the acquired feature quantity information 52, classification folder information 53, the classification determination information 54, feature quantity criterion information 55, the user rule update condition information 56, the overall rule update condition information 57, user notification setting information 58, etc.

FIGS. 2 to 9 are explanatory diagrams of an embodiment of information stored in the storage 50.

The input document data 51 is the image data on a document read by the scanner.

For example, when a single document placed on the platen is read by the scanner, the image data on the document is obtained, and the image data stored with a file name is the input document data.

According to one aspect of the present invention, the input document data is classified based on the type of document and is stored in a storage folder, and the file name is associated with the name (user name) of the user who has performed the operation so as to read the document and the feature quantity with which the type of document is distinguished.

FIG. 2 is an explanatory diagram of an embodiment of the input document data 51 stored in the storage 50.

FIG. 2 illustrates an embodiment of the six pieces of input document data 51.

Here, the input document data 51 stored in association with the file name, the user name, and the feature quantity is illustrated. The storage folder may be also associated and stored.

For example, the first input document data 51 in FIG. 2 indicates that the file name is "F001", the user name is "the user U1", the feature quantity is "A", and the storage folder storing the input document data 51 is the folder with the name "MTG material" (meeting material).

Furthermore, it indicates that the storage folder "MTG material" has the feature quantity "A", and the specific content of the feature quantity "A" is, for example, as illustrated in FIG. 5 described below.

The acquired feature quantity information 52 is feature quantity acquired from the input document data 51.

Read documents include various types of documents, such as the one exclusively including a character, the one exclusively including an image, the one including a character and a photograph, and the one including a figure, table, or graph, and documents having a certain format or a specific keyword.

The information obtained by analyzing the image data on the acquired document and extracting feature information such as character or figure, e.g., a certain format or a specific keyword, corresponds to feature quantity.

FIG. 3 is an explanatory diagram of an embodiment of the acquired feature quantity information 52 stored in the storage 50.

FIG. 3 illustrates an embodiment of the acquired feature quantity information 52 of the input document data 51 with the first file name "F001" in FIG. 2.

Here, it is indicated that, as a result of analysis of the input document data 51 with the file name "F001", the file extension, the characters "agenda", the characters "meeting", and the characters "countermeasure" have been acquired as feature quantity.

The file extension is information ".pptx", the characters "agenda" are present on the second line of the first page of the input document data 51, the characters "meeting" are present on the third line of the first page of the input document data 51, and the characters "countermeasure" are present on the eighth line of the third page of the input document data 51.

Although the acquired feature quantity information 52 having the four pieces of feature quantity is illustrated in FIG. 3, the number of pieces of feature quantity is not limited to the four pieces of feature quantity; a larger number of pieces of feature quantity may be acquired from some read documents, and no feature quantity may be acquired from others.

The acquired feature quantity information 52 is compared with the feature quantity criterion information 55 described below so that the folder into which the input document data 51 is classified and stored is determined.

For example, when there is the feature quantity criterion information 55 that matches the four pieces of feature quantity of the acquired feature quantity information 52 in FIG. 3 and the storage folder associated with the feature quantity criterion information 55 is "MTG material", the input document data 51 with the file name "F001" is classified and stored in the storage folder with the name "MTG material".

The classification folder information 53 is information about the folder (storage folder) in which the input document data 51 is stored after the input document data 51 is classified.

The classification folder information 53 is, for example, information including the name (folder name) of the storage folder, the feature quantity, and the information of the file stored in the storage folder. The storage folder is also referred to as classification folder.

FIG. 4 is an explanatory diagram of an embodiment of the classification folder information 53 stored in the storage 50.

FIG. 4 illustrates information about four storage folders.

It is indicated that, for example, the storage folder with the name "MTG material" is a folder storing a file with the feature quantity "A" and two files (input document data) with the file names "F001" and "F003" are currently stored in the storage folder.

The input document data with the file name "F001" is a document input by the user U1, and the input document data with the file name "F003" is a document input by a user U2.

It is indicated that the storage folder with the name "minutes" is a folder storing a file having feature quantity "C" and two files (input document data) with file names "F002" and "F050" are currently stored in the storage folder.

The input document data with the file name "F002" is a document input by the user U1, and the input document data with the file name "F050" is a document input by a user U5.

It is indicated that the storage folder with the name "order form" is a folder storing a file having feature quantity "B" and the file (input document data) with a file name "F004", which is a document input by the user U3, is currently stored in the storage folder.

It is indicated that the file (input document data) having a file name "F100" and feature quantity "X", which is a document input by the user U3, is currently stored in the storage folder with the name "unclassified".

The storage folder with the name "unclassified" is a folder temporarily storing a file that has not been classified into any of the existing classification folders.

The feature quantity "X" of the file with the name "F100" is feature quantity that does not match the feature quantity of the existing classification folders.

As it is inconvenient for reuse such as viewing later on if files are continuously stored in the storage folder with the name "unclassified", the user who has input preferably performs the operation to move the file to the existing storage folder or create a storage folder with a new name and move the file to the new storage folder.

The classification determination information 54 is information that stores a rule (determination criterion rule) that is a determination criterion for classifying the image data (input document data) on an input document. As described above, the determination criterion rule includes the overall classification rule (also referred to as AR) and the user classification rule (also referred to as UR) and is stored separately for each piece of feature quantity.

In principle, the overall classification rule AR is a criterion (rule) applied to all the users and is information in which the criterion for classifying a document having specific feature quantity is set in association with the specific feature quantity.

For example, in a case where only the overall classification rule AR is set in association with the feature quantity P1 and the user classification rule UR for each user is not set, when the image data on the document input by a user U and having the feature quantity P1 is classified, the overall classification rule AR is applied so that the image data input by the user U is classified and stored.

That is, when the acquired feature quantity of the input document data is P1, the overall classification rule AR stored in association with the feature quantity P1 is applied so that the input document data is classified and stored.

There is an exception that, when the overall classification rule AR and the user classification rule UR are stored in association with identical feature quantity P2, the user classification rule UR is preferentially applied.

For example, in a case where the overall classification rule AR and the user classification rule UR of the user U are set in association with the feature quantity P2, when the image data on the document input by the user U and having the feature quantity P2 is classified, the user classification rule UR of the user U is preferentially applied so that the image data input by the user U is classified and stored.

As described above, the user classification rule UR is information which is set and stored for each individual user and in which the criterion for classifying a document having specific feature quantity is set in association with the specific feature quantity, and each of the user classification rules UR is applied exclusively to an individual user. For example, when there is the user classification rule UR for the user U2 that is stored in association with feature quantity C and the acquired feature quantity of the input document data, which is input by the user U2, is C, the user classification rule UR of the user U2 is applied so that the input document data is classified and stored.

As described above, both the overall classification rule AR and the user classification rule UR are changed due to a specific classification operation performed by the user.

It is assumed that, for example, after the document data acquirer 22 acquires the image data on the document input by the user U, the document feature quantity acquirer 23 acquires feature quantity P on the acquired image data, and the user U uses the operation device 12 to perform a specific classification operation M on the image data on the document having the acquired feature quantity P.

Here, the user rule updater 27 changes the criterion of the user classification rule of the user U associated with the acquired feature quantity P to the criterion corresponding to the specific classification operation M.

It is assumed that the specific classification operation performed by the user U is the operation to move the image data on the document having the acquired feature quantity P to a predetermined storage folder F.

In this case, the user rule updater 27 changes the criterion of the user classification rule of the user U in association with the acquired feature quantity P to the criterion indicating that the image data on the document input by the user U in the future and having the feature quantity P is stored in the predetermined storage folder F.

A specific example of the classification determination information 54 is described below.

The feature quantity criterion information 55 is information that is the criterion for determining the feature quantity acquired from the input document data on the document when the input document data is classified. The feature quantity criterion information 55 is used for determining a folder (storage folder) into which the input document data is classified and is previously set and stored for each storage folder.

For example, when there is the storage folder with the name "MTG material", the feature quantity of the file to be stored in the storage folder is stored as the feature quantity criterion information 55 in association with the "MTG material".

FIG. 5 is an explanatory diagram of an embodiment of the feature quantity criterion information 55 stored in the storage 50.

FIG. 5 illustrates the information about two storage folders (MTG material and minutes).

It is assumed that the feature quantity in the storage folder with the name "MTG material" is referred to as the feature quantity A and the feature quantity in the storage folder with the name "minutes" is referred to as the feature quantity C.

FIG. 5 indicates that the feature quantity (the feature quantity A) in the storage folder with the name "MTG material" include six pieces of information and the feature quantity (the feature quantity C) in the storage folder with the name "minutes" include five pieces of information.

For example, the feature quantity A regarding the MTG material include the following information.
1) The file extension is either ".pptx" or ".jpg".
2) The character string "agenda" is included before the tenth line from the top on the first page.
3) Either the character string "MTG" or "meeting" is included before the tenth line from the top on the first page.
4) The character string "task" is included before the tenth line from the top on the first page.
5) The file contains either the character string "examination result" or "information sharing".
6) The file contains any character string of "counterplan", "measure", "proposed action", and "remedy".

For example, when the feature quantity (acquired feature quantity information) acquired from the input document data include at least two or more of the six pieces of information of the above-described feature quantity A, it is determined that the input document data is the document having the feature quantity A.

Alternatively, it may be determined that the document has the feature quantity A when the feature quantity (acquired feature quantity information) acquired from the input document data include all the six pieces of information of the feature quantity A.

Furthermore, multiple pieces of feature quantity in the storage folder are previously set and stored so that the feature quantity to be used among the pieces of feature quantity may be set and changed, or the standard number (minimum number) of pieces of matching information for determining that the document has the feature quantity in the storage folder may be also set and changed.

The feature quantity C regarding the minutes include the following information.

1) The file name includes "minutes".
2) The character string "MTG" or "meeting" is included before the tenth line from the top on the first page.
3) The character string "minutes" is included before the tenth line from the top on the first page.
4) The character string "participant" is included before the tenth line from the top on the first page.
5) The character string corresponding to "location" or "date and time" is included before the tenth line from the top on the first page.

The content of the feature quantity illustrated in FIG. 5 is an embodiment and is not a limitation; the content of the feature quantity may be added, changed, and deleted by a user or an administrator who uses the image forming apparatus.

FIG. 6 is an explanatory diagram of an embodiment of the feature quantity criterion information 55 regarding the storage folder "purchase order". The feature quantity of the storage folder with the name "purchase order" is referred to as feature quantity B.

The feature quantity criterion information 55 may be set with the information illustrated in FIG. 5 described above.

The feature of the document may be a document format, layout, ruled line composition, figure, table, ledger format, etc., and the input document data may be classified easily and accurately when the feature quantity of the document is represented by using the document format, etc.

In this case, the image data itself on the document may be previously stored as the feature quantity criterion information 55.

For example, FIG. 6 illustrates an embodiment of the image data on "purchase order", and the image data itself is previously stored as the feature quantity criterion information 55 regarding the storage folder "purchase order".

When the image data (input document data) on the input document substantially matches the image data on "purchase order" stored in the feature quantity criterion information 55, it is determined that the input document data has the feature quantity B and is classified and stored in the storage folder with the name "purchase order".

As the feature quantity criterion information 55 regarding the storage folder "purchase order", not only the image data in FIG. 6 but also, for example, the information indicating that the character string "purchase order" is included in the initial line or the character string such as "order No", "subject", or "delivery deadline" is included may be previously set and stored.

When documents such as MTG material or minutes have their own typical formats, or the like, the image data thereof may be previously set and stored as the feature quantity criterion information 55 regarding the storage folder for the MTG material and the minutes.

The user rule update condition information 56 is information in which a condition for updating the user classification rule UR of the classification determination information 54 (as to whether the user classification rule is updated) is previously set.

FIG. 7 is an explanatory diagram of an embodiment of the user rule update condition information 56 stored in the storage 50.

FIG. 7 illustrates the previously set information (valid or invalid) as to whether the user classification rule UR is updated on a per user basis.

Here, "valid" is information indicating that the user classification rule UR is updated, and "invalid" is information indicating that the user classification rule UR is not updated.

A case where "valid" is set in the user rule update condition information 56 for a certain user indicates that, when an event causing a change in the criterion of the overall classification rule AR of the classification determination information 54 occurs, the criterion of the user classification rule UR of the user corresponding to the overall classification rule AR is changed to the criterion identical to that of the overall classification rule AR.

Conversely, a case where "invalid" is set in the user rule update condition information 56 for a certain user indicates that, when an event causing a change in the criterion of the overall classification rule AR associated with the feature quantity P occurs, the criterion of the user classification rule UR of the user U associated with the feature quantity P is not changed and the criterion of the overall classification rule AR associated with the feature quantity P before the change is set as the criterion of the user classification rule UR of the user U, or if the criterion of the user classification rule UR of the user U has been set already, the already set criterion of the user classification rule UR of the user U is maintained.

For example, in FIG. 7, as the user rule update condition information 56 of the four users (U1, U2, U3, and U5) is "valid", when an event causing a change in the overall classification rule AR occurs, the criteria of the user classification rules UR of the users (U1, U2, U3, and U5) corresponding to the overall classification rule AR are also changed to the criterion identical to that of the overall classification rule AR.

As the user rule update condition information 56 of the user U4 in FIG. 7 is "invalid", even when an event causing a change in the overall classification rule AR of the classification determination information 54 occurs, the criterion of the user classification rule UR of the user U4 corresponding to the overall classification rule AR is not changed, and the current criterion of the user classification rule UR of the user U4 is maintained.

The overall rule update condition information 57 is information in which a condition for updating the overall classification rule of the classification determination information 54 is previously set.

In particular, when the condition set in the overall rule update condition information 57 is satisfied with regard to the operation performed on the file classified and stored by the application of the overall classification rule AR corresponding to certain feature quantity, the overall classification rule AR is updated.

The overall rule update condition information 57 is set to prevent the update to the overall classification rule AR that sets the storage folder storing an already classified and stored file FA due to a changing operation performed by a certain user when the user changes the storage folder of the file FA.

In principle, the overall rule update condition information 57 sets the condition for updating the overall classification rule AR when multiple users perform the identical operation on a file having the identical feature quantity.

For example, the minimum number or the minimum rate of users for whom the criterion corresponding to the identical classification operation is set in the user classification rules UR of the users may be preset in the overall rule update condition information 57.

In this case, when the criterion corresponding to the identical classification operation is set in the user classification rules UR of equal to or more than the minimum number of users or equal to or more than the minimum rate of users, the criterion of the overall classification rule AR associated with the certain feature quantity P is changed to the criterion corresponding to the identical classification operation.

A designated user who may change the criterion of the overall classification rule AR may be preset in the overall rule update condition information 57.

In this case, the overall classification rule AR and the user classification rule UR of the designated user who is able to change the criterion of the overall classification rule AR are set in association with the feature quantity P, and when the criterion of the overall classification rule AR is different from the criterion of the user classification rule UR of the designated user, the criterion of the overall classification rule AR associated with the feature quantity P is changed to the criterion identical to that of the user classification rule UR of the designated user.

FIG. 8 is an explanatory diagram of an embodiment of the overall rule update condition information 57 stored in the storage 50.

FIG. 8 illustrates the three pieces of overall rule update condition information 57, and when any of the conditions is satisfied, the corresponding overall classification rule AR is updated.

According to a first condition in FIG. 8, the update condition item is "the number of people for the identical operation: N", and the update condition is set such that the number of people N for the identical operation is three or more (N≥3).

The first condition in FIG. 8 is satisfied when, for example, a storage folder FD1 storing a file is set in an overall classification rule AR1 corresponding to the certain feature quantity B and four users have performed the operation to move the file stored in the storage folder FD1 to a different storage folder FD7 corresponding to different feature quantity D.

When the first condition in FIG. 8 is satisfied, the content of the overall classification rule AR1 corresponding to the feature quantity B is updated (changed) from the storage folder FD1 to the storage folder FD7.

According to a second condition in FIG. 8, the update condition item is "the rate for the identical operation: R", and the update condition is set such that the rate R for the identical operation is 70% or more (R 70).

The second condition in FIG. 8 is satisfied when, for example, 70% or more of the users registered in the image forming apparatus have performed the identical moving operation, and the current overall classification rule AR is updated to the overall classification rule AR corresponding to the identical moving operation.

According to a third condition in FIG. 8, the update condition item is "the designated user", and "the user U5" is set as an update condition.

In this case, regardless of the number or the rate of people who have performed the identical operation, when the user U5 who is a designated user has performed some operation, the current overall classification rule AR is updated to the overall classification rule AR corresponding to the operation performed by the user U5.

For example, an administrator of the image forming apparatus, a person in charge of setting a classification folder, or the like, is set previously as a designated user.

The third condition in FIG. 8 is satisfied when, for example, a storage folder FD5 storing a file is set in an overall classification rule AR5 corresponding to certain feature quantity E and the designated user U5 has performed the operation to move the file stored in the storage folder FD5 to a different storage folder FD6 corresponding to different feature quantity F, and therefore the content of the overall classification rule AR5 corresponding to the feature quantity E is updated (changed) from the storage folder FD5 to the storage folder FD6.

Not only the conditions illustrated in FIG. 8 but also other conditions may be preset in the overall rule update condition information 57, and the number and the rate of people and the designated user may be changed, added, or deleted by an administrator, etc.

By setting the overall rule update condition information 57, a classification folder that is likely to be set as a storage destination by multiple users may be set as the storage folder of input document data, and the input document data may be less likely to be stored in a classification folder that is not intended by the user.

As the input document data is stored in the classification folder that is likely to be set as the storage destination by multiple users, it is easy for multiple users using the image forming apparatus to reuse the stored document data.

As the possibility of storage in a classification folder not intended by the user may be reduced, it is possible to reduce the operation of reclassifying document data into a classification folder accessible by the user, and it is possible to reduce the user's operational burden when the input document data is classified and stored.

The user notification setting information 58 is information in which the method for notifying the user of the classification folder (storage folder) storing the input document data on the document input by the user is preset.

The user is notified of the folder name, or the like, of the storage folder based on the content set in the user notification setting information 58.

The user notification setting information 58 may be set as a default notification method regardless of a user or may be set for each user.

FIG. 9 is an explanatory diagram of an embodiment of the user notification setting information 58 stored in the storage 50.

The default notification setting method illustrated in FIG. 9 is a notification method used regardless of a user.

For example, when "display" is set as a default notification setting method, the folder name, or the like, of the storage folder is displayed on the display 13.

The user views the folder name of the storage folder displayed on the display 13 so as to confirm whether the storage destination of the input document data on the document is the classification destination intended by the user. When the storage destination is the classification destination intended by the user, the user may perform the input operation indicating the approval of the classification.

The notification method is not only display but also other methods.

For example, "transmission" or "confirmation request" may be set as well as "display" as a default notification setting method.

Here, "transmission" refers to the transmission of information, such as the folder name of the storage folder, to a personal computer owned by the user or an information processing apparatus designated by the user.

Further, "confirmation request" refers to the transmission of information, such as the folder name of the storage folder, to the information processing apparatus that has transmitted the user's confirmation request for the storage folder when the confirmation request is transmitted to the image forming apparatus from another information processing apparatus.

FIG. 9 illustrates a case where the user notification setting information 58 is set for each user.

The user notification setting information 58 for each user is stored in association with, for example, the user name and the availability of each notification method (display, transmission, and upon confirmation request reception).

For the user U1 in FIG. 9, the availability of "display" and "upon confirmation request reception" is set as the method for notifying a storage folder; the storage folder of the document input by the user U1 is notified by "display" and is further notified when a confirmation request is received from the user U1.

With regard to, for example, the user U5 in FIG. 9, the storage folder is notified to the user U5 by three notification methods of "display", "transmission", and "upon confirmation request reception".

Each user may preferably change, add, or delete the settings in the user notification setting information 58 on the user.

Embodiment of Process to Classify and Store Input Document Data

An embodiment of the process to classify and store the input document data is described by using the classification determination information 54 illustrated in FIGS. 10 to 15.

First, FIG. 10 is an explanatory diagram of an embodiment of the classification determination information 54 stored in the storage 50.

In FIG. 10, the classification determination information 54 includes learning data and the user classification rule of each user.

The following embodiment is described by using the classification determination information 54 in FIG. 10 as classification determination information BH00 in the initial state.

Both the learning data and the user classification rule UR of each user are changed due to the user's input operation.

The learning data is set for each piece of preset feature quantity and includes the overall classification rule AR associated with each piece of feature quantity.

As described above, the feature quantity represents the feature quantity of the input document data, and the file of the input document data having certain feature quantity is, in principle, classified based on the overall classification rule AR and is stored in a predetermined storage folder (classification folder).

According to the embodiment below, the overall classification rule AR is associated with a storage folder, and the overall classification rule AR stores the storage folder name.

For example, in FIG. 10, the feature quantity A is associated with the storage folder name "MTG material" that is the overall classification rule AR.

This means that a file of the input document data having the feature quantity A is, in principle, stored in the storage folder with the storage folder name "MTG material" that is the overall classification rule AR.

Further, in FIG. 10, the feature quantity B is associated with the storage folder name "order form" that is the overall classification rule AR, and it means that a file of the input document data having the feature quantity B is, in principle, stored in the storage folder with the storage folder name "order form".

Similarly, the feature quantity C is associated with the storage folder name "minutes" that is the overall classification rule AR, and it means that a file of the input document data having the feature quantity C is, in principle, stored in the storage folder with the storage folder name "minutes".

The user classification rule UR of each user is also set for each piece of preset feature quantity.

The user classification rule UR of each user is also associated with the storage folder, and the user classification rule UR stores the storage folder name.

When the storage folder name is stored in the user classification rule UR corresponding to certain feature quantity, a file of the input document data having the feature quantity is stored in the storage folder (classification folder) stored in the user classification rule UR without being classified based on the overall classification rule AR.

In FIG. 10, as no storage folder names are stored in the user classification rules UR corresponding to the feature quantity A, all the files of the input document data having the feature quantity A are classified based on the overall classification rule AR and stored in the storage folder "MTG material".

The storage folder name "MTG material" is stored in the user classification rule UR of the user U3 among the user classification rules UR corresponding to the feature quantity B.

Therefore, the file of the input document data input by the user U3 and having the feature quantity B is stored in the storage folder "MTG material" due to the application of the user classification rule UR of the user U3 without being classified based on the overall classification rule AR.

On the other hand, as no storage folder names are stored in the user classification rules UR of the other users corresponding to the feature quantity B, the files of the input document data input by the users other than the user U3 and having the feature quantity B are classified based on the overall classification rule AR and are stored in the storage folder "order form".

The storage folder name "MTG material" is stored in the user classification rules UR of the users U2 and U5 among the user classification rules UR corresponding to the feature quantity C.

Therefore, the files of the input document data input by the users U2 and U5 and having the feature quantity C are stored in the storage folder "MTG material" due to the application of the user classification rules UR of the users U2 and U5 without being classified based on the overall classification rule AR.

On the other hand, as no storage folder name are stored in the user classification rules UR of the other users (U1, U3, and U4) corresponding to the feature quantity C, the files of the input document data input by the users (U1, U3, and U4) and having the feature quantity C are classified based on the overall classification rule AR and stored in the storage folder "minutes".

In a case where the classification determination information BH00 in the initial state illustrated in FIG. 10 is stored, when for example the user U4 causes the document to be read and the input document data on the read document is the input document data (a file F123) having the feature quantity C, the file F123 is classified based on the overall classification rule AR and is stored in the storage folder "minutes" as the overall classification rule AR corresponding to the feature quantity C is "minutes" and the user classification rule UR of the user U4 corresponding to the feature quantity C is not present as a result of the retrieval of the classification determination information BH00.

Furthermore, in a case where the classification determination information BH00 in the initial state illustrated in FIG. 10 is stored, when the user U3 causes the document to be read and the input document data on the read document is the input document data (a file F333) having the feature quantity B, the file F333 is stored in the storage folder "MTG material" by the prioritized application of the user classification rule UR of the user U3 as "MTG material" is stored in the user classification rule UR of the user U3 corresponding to the feature quantity B although the overall classification rule AR corresponding to the feature quantity B is "order form" as a result of the retrieval of the classification determination information BH00.

In this case, although the file F333 of the document input by the user U3 has the feature quantity B corresponding to "order form", the user U3 desires (has made the setting) to classify it into "MTG material", and therefore the file F333 is stored in the storage folder "MTG material" for only the user U3.

First Embodiment

An embodiment of the process to classify and store the input document data is described with reference to FIG. 11.

FIG. 11 illustrates the classification determination information (BH01) 54 after the user U1 uses the operation device 12 to perform the operation to store the file having the feature quantity C in the storage folder "MTG material".

It is assumed that, for example, when the user U1 performs an operation so as to read the document while the classification determination information BH00 of FIG. 10 described above is stored, the input document data (a file F111) of the document is stored in the storage folder "minutes", which is the overall classification rule AR corresponding to the feature quantity C, as the input document data has the feature quantity C.

Further, it is assumed that the user U1 is notified that the input document data on the document is stored in the folder "minutes".

It is assumed that the user U1 confirms the notification content indicating that the storage folder is "minutes" and, when the storage folder is different from the classification folder intended by the user U1, the user U1 performs the operation to move the file F111 to the intended classification folder "MTG material".

In this case, it is considered that, for the user U1, the input document data having the feature quantity C is preferably stored in the storage folder "MTG material" instead of the storage folder "minutes" in the future.

Therefore, as illustrated in FIG. 11, in order not to apply the overall classification rule AR "minutes" corresponding to the feature quantity C to the input document data on the document input by the user U1, "MTG material" is stored in the user classification rule UR of the user U1 corresponding to the feature quantity C. That is, the classification determination information BH00 of FIG. 10 is changed to the classification determination information BH01 of FIG. 11.

Thus, when the input document data on the document input by the user U1 has the feature quantity C, the user classification rule UR of the user U1 is preferentially applied so that the input document data is stored in the storage folder "MTG material" instead of "minutes".

After the user classification rule UR of the user U1 is stored, when the user U1 inputs a similar document having the feature quantity C, the user U1 does not need to perform the operation to move the file to the intended classification folder "MTG material", which may result in a reduction in the operational load of the user U1.

Second Embodiment

An embodiment of the process to classify and store the input document data is described with reference to FIG. 12.

FIG. 12 illustrates the classification determination information (BH02) 54 after the overall classification rule of the feature quantity C is changed when the current classification determination information 54 satisfies the overall rule update condition information 57. The current classification determination information 54 is the classification determination information BH01 illustrated in FIG. 11 above.

With regard to the user classification rule UR of the feature quantity C in the classification determination information BH01 illustrated in FIG. 11, there are three users for whom "MTG material" is set, which is different from the overall classification rule "minutes" of the feature quantity C.

Specifically, the users who have performed the operation to store the file having the feature quantity C in the storage folder "MTG material" are the user U1, the user U2, and the user U5, and it means that there are three users who have performed the identical operation on the files having the identical feature quantity C.

When the first condition (N≥3) of the overall rule update condition information illustrated in FIG. 8 is set and stored as the overall rule update condition information 57, the condition that "the number of people who have performed the identical operation is three or more" in the overall rule update condition information 57 is satisfied in the classification determination information BH01 illustrated in FIG. 11.

Thus, as multiple users have performed the identical moving operation to change the storage folder from "minutes" to "MTG material" without following the current overall classification rule "minutes" of the feature quantity C, the overall classification rule AR of the feature quantity C is changed.

Specifically, as illustrated in FIG. 12, the overall classification rule AR of the feature quantity C is changed from "minutes" to "MTG material".

Afterward, when the input document data on the input document has the feature quantity C, the overall classification rule AR "MTG material" of the feature quantity C is applied to not only the three users (U1, U2, and U5) but also the users (U3 and U4) for whom the user classification rule UR corresponding to the feature quantity C is not set so that the input document data is stored in the storage folder "MTG material" instead of "minutes".

Initially, there is the setting such that the input document data having the feature quantity C needs to be stored in the folder "minutes"; however, if multiple users have performed the identical operation to move the input document data having the feature quantity C to the storage folder "MTG material", it is considered that the input document data having the feature quantity C is often stored in the storage folder "MTG material".

Therefore, after the overall classification rule AR corresponding to the feature quantity C is changed, the input document data having the feature quantity C is, in principle, stored in the storage folder "MTG material", and therefore it is possible to increase the possibility of a reduction in the operational burden on the user when the input document data having the feature quantity C is classified.

Third Embodiment

An embodiment of the process to classify and store the input document data is described with reference to FIG. 13.

FIG. 13 illustrates the classification determination information (BH03) 54 after the user classification rule UR of the user U4 corresponding to the feature quantity C is restored when the user rule update condition information 56 of the user U4 is set to "invalid" although the overall classification rule AR of the feature quantity C is changed as described in FIG. 12.

Restoring the user classification rule UR refers to restoring to the previous user classification rule UR applied before the overall classification rule AR is changed or the previous overall classification rule AR (maintaining the previous overall classification rule AR).

It is assumed that the classification determination information 54 after the overall classification rule AR of the feature quantity C is changed is the classification determination information BH02 described above in FIG. 12 and the previous classification determination information 54 before the overall classification rule AR of the feature quantity C is changed is the classification determination information BH01 described above in FIG. 11.

Further, as illustrated in FIG. 7, it is assumed that the user rule update condition information 56 of the user U4 is set to "invalid". In this case, even when the overall classification rule AR is changed, the user classification rule UR of the user U4 is maintained (not changed).

In the previous classification determination information BH01 of FIG. 11 before the overall classification rule AR of the feature quantity C is changed, the overall classification rule AR of the feature quantity C is "minutes", and the user classification rule UR of the user U4 corresponding to the feature quantity C is not set; therefore, when the user U4 causes the document having the feature quantity C to be read, the input document data on the document of the user U4 is stored in the storage folder "minutes" by the application of the overall classification rule AR "minutes".

On the other hand, in a case where the overall classification rule AR of the feature quantity C is changed to obtain the classification determination information BH02 in FIG. 12, when the user U4 causes the document having the feature quantity C to be read, the input document data on the document of the user U4 is stored in the storage folder "MTG material" by the application of the overall classification rule AR "MTG material" as the overall classification rule AR of the feature quantity C has been changed to "MTG material".

If the user rule update condition information 56 of the user U4 is set to "invalid", however, the user classification rule UR of the user U4 is maintained (not changed) even though the overall classification rule AR is changed; therefore, when the user classification rule UR of the user U4 corresponding to the feature quantity C is set, in principle, the user classification rule UR of the user U4 in the previous classification determination information BH01 of FIG. 11 before the overall classification rule AR is changed needs to be applied.

In the classification determination information BH01 of FIG. 11, as the user classification rule UR of the user U4 corresponding to the feature quantity C is not set, the overall classification rule AR "minutes" of the feature quantity C is applied.

With regard to the user U4 for whom the user rule update condition information 56 is set to "invalid", in order to maintain the user classification rule UR of the user U4 corresponding to the feature quantity C, the overall classification rule AR "minutes" of feature quantity C in the classification determination information BH01 of FIG. 11 is set and stored in the user classification rule UR of the user U4 corresponding to the feature quantity C.

Specifically, in a case where the user rule update condition information 56 of the user U4 is set to "invalid", the user classification rule UR of the user U4 is maintained (not changed), and therefore "minutes", which is the previous overall classification rule AR of the feature quantity C, is set and stored in the user classification rule UR of the user U4 corresponding to the feature quantity C as illustrated in the classification determination information BH03 of FIG. 13.

Accordingly, when the user U4 subsequently causes the document having the feature quantity C to be read, the user classification rule UR "minutes" of the user U4 corresponding to the feature quantity C in the classification determination information BH03 is applied so that the input document data on the document of the user U4 is stored in the storage folder "minutes".

In a case where the user rule update condition information 56 of the user U4 is set to "valid" in the state of the classification determination information BH02 of FIG. 12, when the overall classification rule AR is changed, the user classification rule UR of the user U4 is also changed to have the content identical to that of the overall classification rule AR; therefore, the user classification rule UR of the user U4 corresponding to the feature quantity C is not newly set as illustrated in FIG. 13, and the state of the classification determination information BH02 in FIG. 12 is maintained.

Fourth Embodiment

An embodiment of the process to classify and store the input document data is described with reference to FIGS. 14 and 15.

FIG. 14 illustrates the classification determination information (BH04) 54 after the designated user U5 causes the input document data (a file F050) on the document having the feature quantity A to be read and performs the operation (moving operation) so as to store the file F050 in the storage folder "minutes" in the classification determination information BH00 in the initial state as described above in FIG. 10.

FIG. 15 illustrates the classification determination information (BH05) 54 after the overall classification rule AR corresponding to the feature quantity A is changed from the state of the classification determination information BH04 in FIG. 14.

It is assumed that, as illustrated in FIG. 8, "the user U5" is set as a designated user in the overall rule update condition information 57. In this case, the overall classification rule AR is changed to the overall classification rule AR corresponding to the operation performed by the user U5 who is a designated user.

Furthermore, it is assumed that, as illustrated in FIG. 7, the user rule update condition information 56 of the user U4 is set to "invalid". In this case, even though the overall classification rule AR is changed, the user classification rule UR of the user U4 is maintained (not changed).

In the classification determination information BH00 in the initial state of FIG. 10, in principle, when the overall classification rule AR is applied, the overall classification rule AR "MTG material" corresponding to the feature quantity A is applied to the input document data (the file F050) on the document having the feature quantity A so that the file F050 is stored in the storage folder "MTG material".

In a case where the user U5 performs the operation (moving operation) to store the file F050 having the feature quantity A, which is to be stored in the storage folder "MTG material", in the storage folder "minutes", as the user U5 performs the operation with a rule different from the overall classification rule AR corresponding to the feature quantity A, "minutes" is set and stored in the user classification rule UR of the user U5 corresponding to the feature quantity A.

FIG. 14 illustrates the classification determination information BH04 after the operation (moving operation) is performed to store the file F050 having the feature quantity A in the storage folder "minutes" as described above.

In consideration of the overall rule update condition information 57 illustrated in FIG. 8, the user U5 is set as a designated user.

As the user U5 who is a designated user has performed the above-described moving operation, the overall rule update condition information 57 is satisfied.

Therefore, the overall classification rule AR is changed to the overall classification rule AR corresponding to the operation performed by the user U5 who is a designated user; as the operation performed by the user U5 is an operation to move the file F050 having the feature quantity A, the overall classification rule AR corresponding to the feature quantity A is changed.

As the operation performed by the user U5 is the operation to change the storage folder from "MTG material" to "minutes", the overall classification rule AR corresponding to the feature quantity A is changed from "MTG material" to "minutes".

In this case, as the overall classification rule AR corresponding to the operation performed by the designated user U5 is the changed storage folder "minutes" and therefore, as illustrated in FIG. 15, "minutes" is set and stored in the overall classification rule AR corresponding to the feature quantity A as is the case with the user classification rule UR of the user U5 corresponding to the feature quantity A.

As described above, when the user rule update condition information 56 of the user U4 is set to "invalid", the user classification rule UR of the user U4 is maintained (not changed) even though the overall classification rule AR is changed.

Specifically, even though the overall classification rule AR corresponding to the feature quantity A is changed, the user classification rule UR of the user U4 corresponding to the feature quantity A is maintained to have the state of the previous classification determination information 54.

Therefore, even though the overall classification rule AR corresponding to the feature quantity A is changed to "minutes" as described above, the overall classification rule AR "MTG material" corresponding to the feature quantity A in the previous classification determination information BH04 in FIG. 14 is continuously applied to the user classification rule UR of the user U4 corresponding to the feature quantity A.

Although nothing is set and stored in the user classification rule UR of the user U4 corresponding to the feature quantity A in the previous classification determination information BH04 of FIG. 14, "MTG material" is set and stored in the user classification rule UR of the user U4 corresponding to the feature quantity A as illustrated in the classification determination information BH05 of FIG. 15.

Afterward, when the user U4 inputs a document having the feature quantity A while the classification determination information 54 has the state of the classification determination information BH05 of FIG. 15, the input document data on the document is stored in the storage folder "MTG material" due to the application of the user classification rule UR of the user U4 corresponding to the feature quantity A.

On the other hand, when the user (U1, U2, U3, or U5) other than the user U4 inputs a document having the feature quantity A, the input document data on the document is stored in the storage folder "minutes".

Fifth Embodiment

An embodiment of the process to classify and store the input document data is described with reference to FIGS. 16 and 17.

FIG. 16 is an explanatory diagram of an embodiment when the user U3 performs the operation to change the storage folder of the file F100 having feature quantity X.

FIG. 17 illustrates an embodiment of the classification determination information 54 stored in the storage 50 when the operation is performed to change the storage folder as illustrated in FIG. 16.

It is assumed that the feature quantity X is unknown feature quantity contrary to the feature quantity A, the feature quantity B, and the like, of which the feature quantity information is already stored as the feature quantity criterion information as illustrated in FIG. 5.

When the operation (moving operation) is performed to store, in the storage folder corresponding to known feature quantity, a file having unknown feature quantity and stored in the storage folder "unclassified", the information regarding the unknown feature quantity is additionally stored in the classification determination information 54.

When the user U3 causes the document to be read and the input document data on the acquired document is the file F100 having the feature quantity X, the file F100 is stored in the storage folder "unclassified" as the file F100 is not able to be classified into the storage folder having known feature quantity in the classification determination information BH00 of FIG. 10.

In this case, for example, as illustrated in FIG. 16, the information associating the file F100, the user U3, and the feature quantity X is stored in the storage folder "unclassified".

It is assumed that the user U3 is then notified that the storage destination of the read document by the user U3 is the storage folder "unclassified".

Furthermore, it is assumed that, after the user U3 is notified that the storage destination of the document is the storage folder "unclassified" due to the above-described notification, the user U3 performs the operation (moving operation) to change the storage folder of the file F100 from "unclassified" to "minutes" as the storage destination intended by the user U3 is the storage folder "minutes".

In this case, as illustrated in FIG. 16, the file F100 is moved from the storage folder "unclassified" to the storage folder "minutes", and the information associating the file F100, the user U3, and the feature quantity X is stored in the storage folder "minutes".

As the operation is performed to store, in the storage folder "minutes", the file F100 having the unknown feature quantity X stored in the storage folder "unclassified", the new information (learning data) regarding the feature quantity X is additionally stored in the classification determination information 54.

Although it is uncertain whether all the input document data having the feature quantity X is to be stored in the storage folder "minutes" in the future, the feature quantity X and the overall classification rule "minutes" are stored in association with each other as learning data in the classification determination information 54 as illustrated in classification determination information BH06 of FIG. 17 as this is the first time the information regarding the feature quantity X is stored.

As the user U3 has performed the operation to store the file F100 having the feature quantity X in the storage folder "minutes", "minutes" may be stored in the user classification rule UR of the user U3 corresponding to the feature quantity X.

In this case, as the user classification rule UR of the user U3 corresponding to the feature quantity X is set to "minutes", the document input by the user U3 and having the feature quantity X is classified and stored in the storage folder "minutes" intended by the user U3 even though the overall classification rule AR corresponding to the feature quantity X is changed to a storage folder different from "minutes" in the future.

For example, when three or more users have performed the operation to move the file of the document having the feature quantity X from the storage folder "minutes" to "MTG material" in the same manner as that illustrated in FIG. 11, the overall classification rule AR corresponding to the feature quantity X is changed to "MTG material" as in the classification determination information BH02 of FIG. 12.

Figure 18:
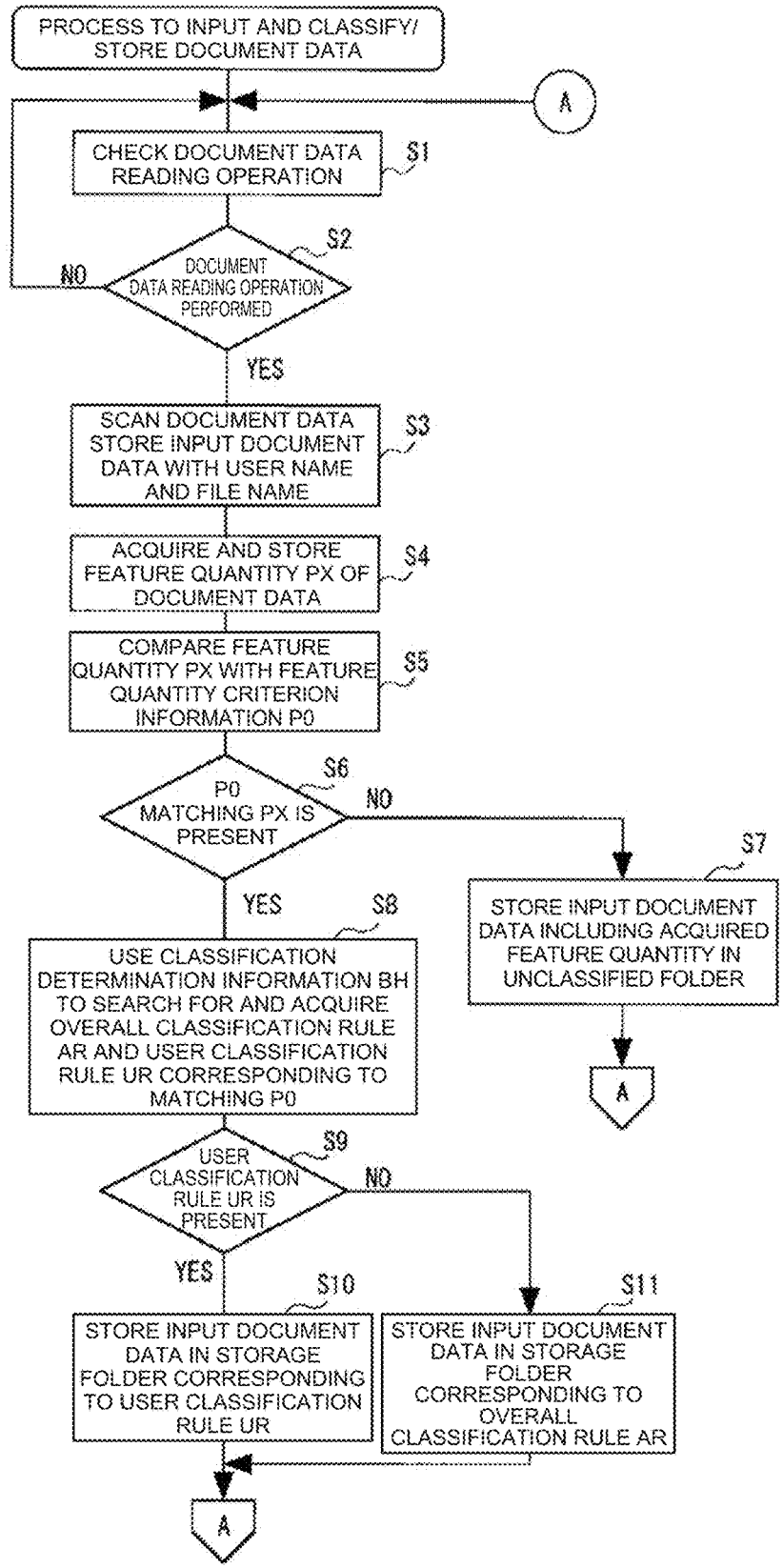
FIG. 18 illustrates a flowchart of an embodiment of the process to input and classify/store document data according to an aspect of the present invention.

Flowchart of Process to Classify and Store Input Document Data FIG. 18 illustrates a flowchart of an embodiment of the process to input and classify/store document data.

In the process described here, when the user places a document on the platen, or the like, and performs a document reading operation, feature quantity is acquired from the input document data on the document, and the overall classification rule or the user classification rule corresponding to the acquired feature quantity is used so that the input document data is classified and stored in a predetermined storage folder.

After the input operation is performed by the user so as to read the document, the image data (input document data) on the read document is stored in the storage folder corresponding to the feature quantity or an unclassified storage folder without other particular input operations.

At Step S1 of FIG. 18, the controller 11 of the image forming apparatus checks whether the reading operation has been performed on the document data (document).

For example, it is checked whether the user has performed the operation to input the "read start key" of the operation device 12.

At Step S2, when the reading operation has been performed on the document data, the process proceeds to Step S3, and if not, the process returns to Step S1.

At Step S3, the scanner, which is the image inputter 15, scans the document data.

After the document data is scanned, the document data acquirer 22 attaches a file name to the acquired image data and stores the image data together with the user name as the input document data 51 in the storage 50.

At Step S4, the document feature quantity acquirer 23 acquires feature quantity PX of the image data stored in the input document data 51 and stores the feature quantity PX as the acquired feature quantity information 52.

The feature quantity PX is stored in association with the stored input document data 51. During the acquisition process of the feature quantity PX, as described above, the conventional image recognition and character recognition processing are used to acquire feature information such as characters and symbols.

At Step S5, the acquired feature quantity PX is compared with feature quantity criterion information P0 previously stored in the storage 50.

For example, the feature quantity criterion information illustrated in FIGS. 5 and 6 described above is searched to find the feature quantity criterion information P0 that matches the feature quantity PX.

At Step S6, when the feature quantity criterion information P0 matching the feature quantity PX is present, the process proceeds to Step S8, and if not, the process proceeds to Step S7.

At Step S7, as the feature quantity criterion information P0 matching the feature quantity PX is not present, the input document data 51 is stored in the unclassified folder.

For example, the file name, the user name, and the feature quantity PX of the input document data 51 are stored in association with each other in the unclassified folder.

Afterward, the process returns to Step S1.

Here, the input document data 51 having the unknown feature quantity PX, which is difficult to be automatically classified, is stored in the unclassified folder.

At Step S8, the classification determination information BH is used to search for the overall classification rule AR and the user classification rule UR corresponding to the feature quantity criterion information P0 that matches the feature quantity PX.

When there are the overall classification rule AR and the user classification rule UR corresponding to the feature quantity criterion information P0 that matches the feature quantity PX, the overall classification rule AR and the user classification rule UR are acquired.

As the overall classification rule AR and the user classification rule UR are stored for each piece of feature quantity in the classification determination information BH, the overall classification rule AR associated with the feature quantity is acquired, and when the user classification rule UR corresponding to the user name of the input document data 51 is stored, the user classification rule UR is acquired.

At Step S9, when the user classification rule UR is acquired, the process proceeds to Step S10 and, when the user classification rule UR is not present, the process proceeds to Step S11.

At Step S10, as the user classification rule UR corresponding to the user name of the input document data 51 is present, the input document data 51 is stored in the storage folder corresponding to the user classification rule UR, and the process returns to Step S1.

As described above, when the storage folder name is stored in the user classification rule UR, the input document data 51 is stored in the folder with the storage folder name.

At Step S11, as the user classification rule UR is not present, the input document data 51 is stored in the storage folder corresponding to the acquired overall classification rule AR, and the process returns to Step S1.

As described above, when the storage folder name is stored in the overall classification rule AR, the input document data 51 is stored in the folder with the storage folder name.

As described above, the read input document data 51 is classified and stored in the storage folder associated with the known feature quantity PX when the feature quantity PX of the input document data 51 is known feature quantity, and the input document data 51 is stored in an unclassified storage folder when the feature quantity PX is unknown feature quantity.

In a case where the feature quantity PX is known feature quantity, when the user classification rule UR of the user who has caused the input document data 51 to be read is present corresponding to the feature quantity PX, the user classification rule UR is preferentially applied so that the input document data 51 is classified and stored in the storage folder corresponding to the user classification rule UR.

When the user classification rule UR of the user who has caused the input document data 51 to be read is not present, the overall classification rule AR corresponding to the known feature quantity PX is applied so that the input document data 51 is classified and stored in the storage folder corresponding to the overall classification rule AR.

Figure 19:
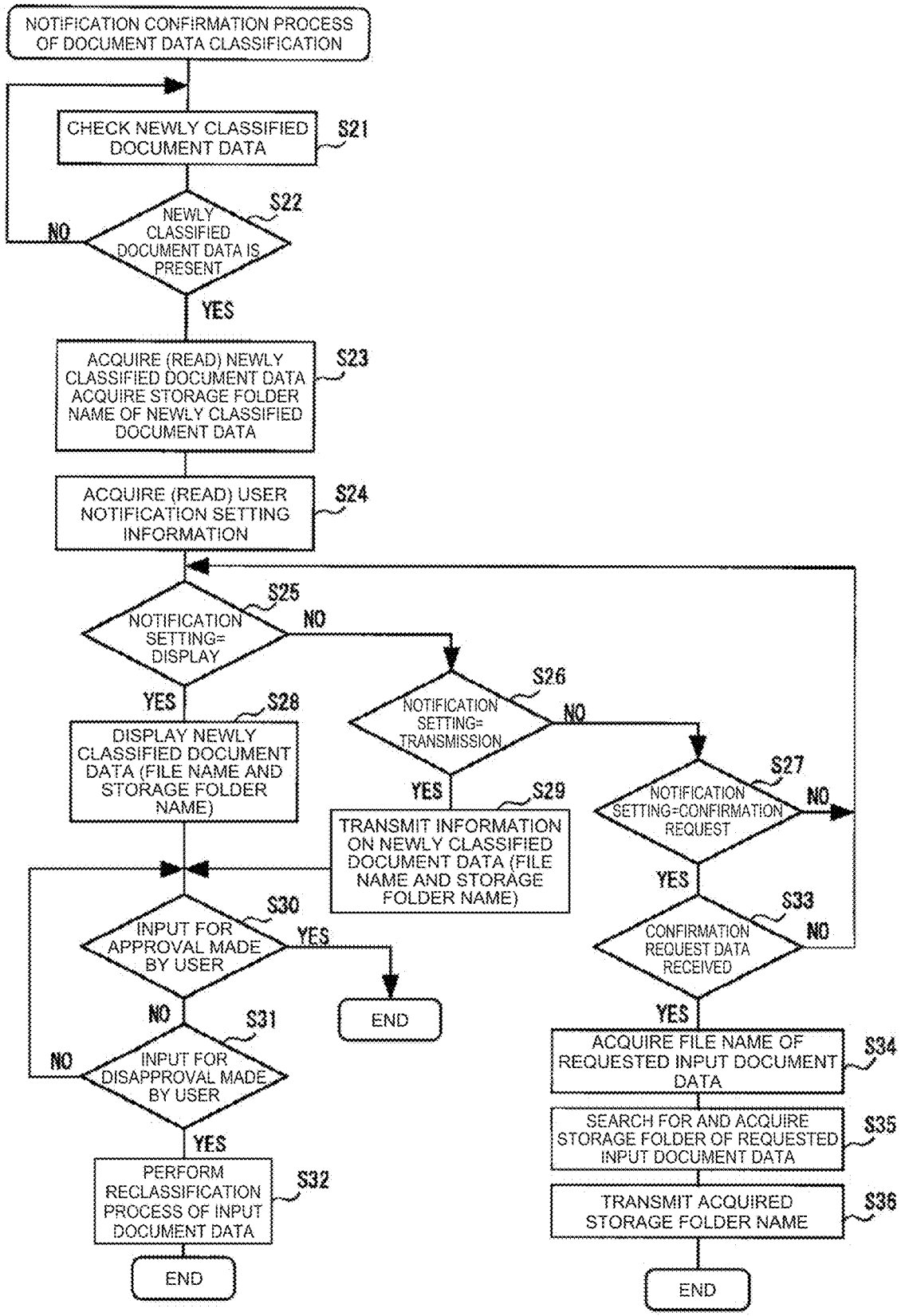
FIG. 19 illustrates a flowchart of an embodiment of a notification confirmation process of a classification of document data according to an aspect of the present invention.

Flowchart of Notification Confirmation Process of Classification of Input Document Data FIG. 19 illustrates a flowchart of an embodiment of the notification confirmation process of the classification of the document data.

In the process described here, after the above-described process is performed to input and classify/store the document data, the folder, or the like, which is the storage destination of the newly classified and stored input document data 51, is notified to the user.

It is assumed that the notification methods include the display, the transmission, and the confirmation request, as described above, the default notification setting method illustrated in FIG. 9 is previously stored as the user notification setting information 58, and any of "display", "transmission", and "confirmation request" is set as a default notification setting method.

It is assumed that the user confirms the notified storage destination folder, or the like, performs the input operation for approval when the storage destination folder is the folder intended by the user, and performs the input operation for disapproval when the storage destination folder is not the folder intended by the user.

At Step S21 of FIG. 19, it is checked whether there is document data that is newly classified and stored.

At Step S22, when there is newly classified and stored document data, the process proceeds to Step S23, and if not, the process returns to Step S21.

At Step S23, the newly classified document data is read from the storage 50, and the storage folder name of the newly classified document data is acquired.

At Step S24, the user notification setting information 58 stored in the storage 50 is read. Here, the default notification setting method is read.

At Step S25, when the notification setting of the default notification setting method is "display", the process proceeds to Step S28, and if not, the process proceeds to Step S26.

At Step S26, when the notification setting of the default notification setting method is "transmission", the process proceeds to Step S29, and if not, the process proceeds to Step S27.

At Step S27, when the notification setting of the default notification setting method is "confirmation request", the process proceeds to Step S33, and if not, the process returns to Step S25.

At Step S28, the display 13 presents the information such as the file name and the storage folder name of the newly classified document data. Alternatively, the user name who has input the newly classified document data may also be displayed.

The user views the display to confirm whether the storage destination folder name of the document read by himself/herself is the intended classification destination folder.

The user who has confirmed the storage destination folder name performs the input operation for "approval" or "disapproval". After Step S28, the process proceeds to Step S30.

At Step S30, when the user performs the input operation for "approval", the storage destination folder name is the classification destination folder intended by the user, and therefore the process ends.

At Step S31, when the user performs the input operation for "disapproval" without performing the input operation for "approval", the storage destination folder name is not the classification destination folder intended by the user, and therefore the process proceeds to Step S32, and if not, the process returns to Step S30.

At Step S32, the reclassification process of the input document data is executed, and the process ends.

During the reclassification process, for example, the user may perform the input operation to move the input document data on the document read by himself/herself from the current storage folder to the storage folder intended by the user.

At Step S29, the information such as the file name and the storage folder name of the newly classified document data is transmitted.

Alternatively, the user name who has input the newly classified document data may be also transmitted.

The transmission destination is, for example, a personal computer, a mobile terminal, or the like, owned by the user.

The user views the transmitted content to confirm whether the storage destination folder name of the document read by himself/herself is the intended classification destination folder.

After Step S29, the process proceeds to Step S30 so that the user confirms the storage destination folder name and then performs the input operation for "approval" or "disapproval". The flow after Step S30 is as described above.

At Step S33, when confirmation request data is received from the personal computer, mobile terminal, or the like, owned by the user, the process proceeds to Step S34, and if not, the process returns to Step S25.

It is assumed that the confirmation request data includes, for example, the file name and the user name of the input document data for which confirmation is requested.

At Step S34, the file name of the requested input document data is acquired from the received confirmation request data.

At Step S35, the storage folder storing the file of the requested input document data is searched for, and the name (storage folder name) of the storage folder is acquired.

At Step S36, the acquired storage folder name is transmitted to the personal computer, mobile terminal, or the like, owned by the user who has transmitted the confirmation request data, and the process ends.

Although not illustrated, the personal computer, mobile terminal, or the like, owned by the user displays, for example, the received storage folder name so that the user confirms the storage folder of the input document data.

When the confirmed storage folder of the input document data is an intended storage folder, the personal computer, mobile terminal, or the like, may transmit the response data indicating "approval" to the image forming apparatus.

Conversely, when the confirmed storage folder of the input document data is not an intended storage folder, the personal computer, mobile terminal, or the like, may transmit the response data indicating "disapproval" to the image forming apparatus, and the user may further transmit the information for changing the storage folder of the input document data to the intended storage folder to the image forming apparatus so as to perform the operation to reclassify the input document data. That is, after Step S36, the process may proceed to Step S30 so as to perform the process at Steps S31 and S32.

Flowchart of Process to Update Classification Determination Information

Figure 20:
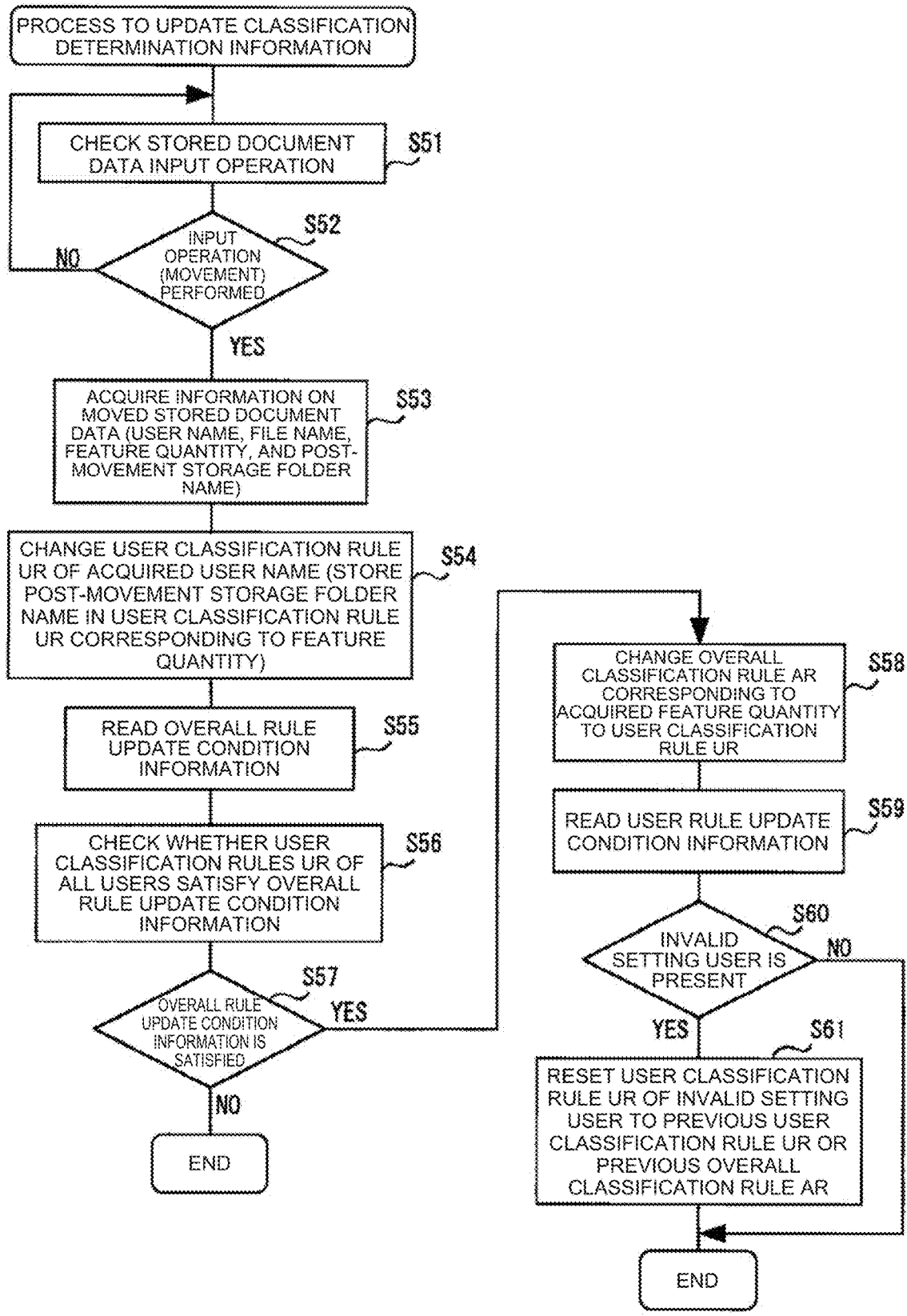
FIG. 20 illustrates a flowchart of an embodiment of the process to update the classification determination information according to an aspect of the present invention.

FIG. 20 illustrates a flowchart of an embodiment of the process to update the classification determination information 54.

In the process described here, when the user performs a predetermined input operation on the input document data (stored document data) currently stored in the storage folder after the above-described classification and storage process is executed, the classification determination information 54 is updated.

The flowchart below illustrates a case where, in particular, the user performs an input operation to move the input document data stored in the storage folder to another storage folder.

At Step S51 of FIG. 20, it is checked whether an input operation has been performed on the input document data (stored document data) stored in the storage folder.

For example, the key input of the operation device 12 is monitored, and it is checked whether the key input is an input operation on the input document data.

The input operation on the input document data is primarily the operation (classification operation) to classify the input document data, for example, the operation to move stored document data, the operation to delete, and the operation to change the file name of stored document data.

At Step S52, when the input operation on the input document data is a moving operation, the process proceeds to Step S53, and if not, the process returns to Step S51.

At Step S53, the information on the moved stored document data is acquired from the classification folder information.

For example, the user name of the stored document data, the file name, the feature quantity, and the post-movement storage folder name are acquired.

At Step S54, the user classification rule UR of the acquired user name is changed with regard to the classification determination information 54.

As the classification determination information 54 stores the overall classification rule AR and the user classification rule UR of each user corresponding to the acquired feature quantity, the user classification rule UR of the acquired user name among the user classification rules UR corresponding to the feature quantity is changed to the post-movement storage folder name.

When nothing is stored in the user classification rule UR of the acquired user name corresponding to the feature quantity, the post-movement storage folder name is stored in the user classification rule UR of the user name.

Thus, when the identical user causes a document having the identical feature quantity to be read in the future, the input document data on the document is classified into and stored in the folder with the post-movement storage folder name.

At Step S55, the overall rule update condition information 57 is read.

At Step S56, it is checked whether the user classification rules UR of all the users in the current classification determination information 54 satisfy the overall rule update condition information 57.

For example, in a case where a lower limit value N of the number of people who have performed the identical operation is preset in the overall rule update condition information 57, when the identical storage folder name, which corresponds to the identical operation performed, is stored in the user classification rule UR corresponding to the acquired feature quantity and the number of users who have performed the identical operation is N or more (the number of the identical storage folder names is N or more), it is determined that the overall rule update condition information 57 is satisfied.

At Step S57, when the overall rule update condition information 57 is satisfied, the process proceeds to Step S58, and if not, the update process ends.

When it is determined that the overall rule update condition information 57 is satisfied, the overall classification rule AR corresponding to the acquired feature quantity is updated.

At Step S58, the overall classification rule AR corresponding to the acquired feature quantity is changed to have the content identical to that of the user classification rule UR of the acquired user name.

For example, the overall classification rule AR corresponding to the acquired feature quantity is changed to the post-movement storage folder name that is stored at Step S54.

The process at Step S58 corresponds to the process to change the overall classification rule AR in the classification determination information 54 described above with reference to FIG. 12.

At Step S59, the user rule update condition information 56 is read.

At Step S60, it is checked whether there is a user for whom "invalid" is set in the user rule update condition information 56, and when there is a user for whom "invalid" is set, the process proceeds to Step S61, and if not, the update process ends.

At Step S61, the user classification rule UR corresponding to the feature quantity acquired by the user (invalid setting user) for whom "invalid" is set is reset to the previous user classification rule UR before a change is made at Step S54.

Alternatively, when the previous user classification rule UR is not set, the user classification rule UR of the invalid setting user corresponding to the acquired feature quantity is reset to the previous overall classification rule AR before a change is made at Step S54. Then, the update process ends.

The process at Step S61 corresponds to the process to change the user classification rule UR of the invalid setting user in the classification determination information 54 described above with reference to FIG. 13.

Thus, when the invalid setting user causes the document having the identical feature quantity to be read in the future, the user classification rule UR of the invalid setting user corresponding to the feature quantity is applied so that the input document data on the document is classified and stored in the storage folder that is set in the user classification rule UR of the invalid setting user.

On the other hand, when the user for whom "valid" is set in the user rule update condition information 56 causes the document having the identical feature quantity to be read in the future, in principle, the overall classification rule AR corresponding to the feature quantity is applied so that the input document data on the document is classified and stored in the storage folder that is set in the overall classification rule AR.

What is claimed is:

1. An image forming apparatus comprising:
an operation device;
a storage that stores classification determination information, the classification determination information comprising a determination criterion rule, including an overall classification rule and a user classification rule, for classifying image data on a document input to the image forming apparatus;
a memory that stores instructions; and
a processor that executes the instructions stored in the memory to:
input image data on a document;
acquire the input image data on the document;
acquire, from the acquired image data, feature quantity that is information with which the document is distinguishable; and
update the user classification rule, wherein
the user classification rule is information in which a criterion for classifying a document having a specific feature quantity is set for each user in association with the specific feature quantity,
when a user uses the operation device to perform a specific classification operation on the image data on the document having the acquired feature quantity, the processor further executes the instructions to change a criterion of the user classification rule of the user associated with the acquired feature quantity to a criterion corresponding to the specific classification operation, the overall classification rule is a determination criterion applied to all users and is information in which a criterion for classifying a document having the specific feature quantity is set in association with the specific feature quantity,
in a case where the overall classification rule and the user classification rule of a user are set in association with the specific feature quantity, when image data on a document input by the user and having the specific feature quantity is classified, the user classification rule of the user is preferentially applied such that the image data input by the user is classified and stored, and in a case where the overall classification rule is set in association with the specific feature quantity and the user classification rule of each user is not set, when the image data on the document input by the user and having the specific feature quantity is classified, the overall classification rule is applied such that the image data input by the user is classified and stored,
the processor further executes the instructions to update the overall classification rule in the classification determination information based on overall rule update condition information preset in the storage,
in a case where the overall classification rule and the user classification rule of a plurality of users are set in association with the specific feature quantity, when a criterion corresponding to an identical classification operation is set in any of the user classification rules of the users and the overall rule update condition information is satisfied, the processor executes the instructions to change a criterion of the overall classification rule associated with the specific feature quantity to the criterion corresponding to the identical classification operation, and
in a case that:
an event causing a change in the criterion of the overall classification rule associated with the specific feature quantity occurs, if a rule update condition information is set to valid, the criterion of the overall classification rule associated with the specific feature quantity, before the change, is set as the criterion of the user classification rule of the user, else if
the rule update condition information is set to invalid, the criterion of the user classification rule of the user corresponding to the overall classification rule is not changed, and the criterion of the user classification rule of the user is previously set, the criterion of the user classification rule of the user which is previously set is maintained.

2. The image forming apparatus according to claim 1, wherein the processor executes the instructions to, when the specific classification operation performed by the user is an operation to move the image data on the document having the acquired feature quantity to a predetermined storage folder, change the criterion of the user classification rule of the user associated with the acquired feature quantity to a criterion indicating that image data on a document input by the user in future, and store a feature quantity that is included in the image data on the document input by the user in the predetermined storage folder.

3. The image forming apparatus according to claim 1, wherein the feature quantity is information which includes a character and a figure acquired by character recognition and image recognition of image data on an input document and with which a type of the input document is distinguishable.

4. The image forming apparatus according to claim 1, wherein a name of a folder, which the document having the specific feature quantity is classified into and stored in, is set as the criterion for classifying the document having the specific feature quantity.

5. The image forming apparatus according to claim 1, wherein
a minimum number or a minimum rate of the users, for which the criterion corresponding to the identical classification operation is set in the user classification rules of the users, is preset in the overall rule update condition information, and
when the criterion corresponding to the identical classification operation is set in the user classification rules equal to or more than the minimum number of users or equal to or more than the minimum rate of users, the criterion of the overall classification rule associated with the specific feature quantity is changed to the criterion corresponding to the identical classification operation.

6. The image forming apparatus according to claim 1, wherein when:
the overall classification rule and the user classification rule of a designated user, who is able to change the criterion of the overall classification rule, are set in association with the specific feature quantity; and the criterion of the overall classification rule is different from the criterion of the user classification rule of the designated user, the criterion of the overall classification rule associated with the specific feature quantity is changed to a criterion identical to the criterion of the user classification rule of the designated user.

7. The image forming apparatus according to claim 1, wherein the processor executes the instructions to, when the criterion of the user classification rule is changed, notify the user of the changed criterion, wherein
a method of notification to the user includes any one or more display of the changed criterion, transmission of the changed criterion to an information processing apparatus of the user, and transmission of the changed criterion to an information processing apparatus of the user in response to a confirmation request transmitted from the information processing apparatus.

8. A document data classification method comprising:

storing classification determination information that includes a determination criterion rule, the determination criterion rule including an overall classification rule and a user classification rule, for classifying image data on a document input to an image forming apparatus, wherein the user classification rule is information in which a criterion for classifying a document having a specific feature quantity is set for each user in association with the specific feature quantity, and the overall classification rule is a determination criterion applied to all users and is information in which a criterion for classifying a document having the specific feature quantity is set in association with the specific feature quantity;

inputting image data on a document by an input operation of the user;

first acquiring the image data on the document input at the inputting;

second acquiring, from the image data on the document acquired at the first acquiring, feature quantity that is information with which the document is distinguishable;

classifying and storing the image data on the document acquired at the first acquiring based on the overall classification rule associated with the specific feature quantity or the user classification rule of the user associated with the specific feature quantity included in the classification determination information;

changing, when the user performs a specific classification operation on the image data on the document having the feature quantity acquired at the second acquiring, a criterion of the user classification rule of the user associated with the feature quantity acquired at the second acquiring to a criterion corresponding to the specific classification operation;

preferentially applying, in a case where the overall classification rule and the user classification rule of a user are set in association with the specific feature quantity, when image data on a document input by the user and having the specific feature quantity is classified, the user classification rule of the user such that the image data input by the user is classified and stored, and applying, in a case where the overall classification rule is set in association with the specific feature quantity and the user classification rule of each user is not set, when the image data on the document input by the user and having the specific feature quantity is classified, the overall classification rule such that the image data input by the user is classified and stored; and in a case where the overall classification rule and the user classification rule of a plurality of users are set in association with the specific feature quantity, when a criterion corresponding to an identical classification operation is set in any of the user classification rules of the users and the overall rule update condition information is satisfied, executing the instructions to change a criterion of the overall classification rule associated with the specific feature quantity to a criterion corresponding to the identical classification operation, and in a case that:

an event causing a change in the criterion of the overall classification rule associated with the specific feature quantity occurs, if a rule update condition information is set to valid, the criterion of the overall classification rule associated with the specific feature quantity, before the change, is set as the criterion of the user classification rule of the user, else if the rule update condition information is set to invalid, the criterion of the user classification rule of the user corresponding to the overall classification rule is not changed, and the criterion of the user classification rule of the user is previously set, the criterion of the user classification rule of the user which is previously set is maintained.

* * * * *